(12) United States Patent
Jang et al.

(10) Patent No.: US 11,046,291 B2
(45) Date of Patent: Jun. 29, 2021

(54) VEHICLE DRIVER ASSISTANCE APPARATUS AND VEHICLE

(71) Applicant: LG ELECTRONICS INC., Seoul (KR)

(72) Inventors: Yujune Jang, Seoul (KR); Sungil Cho, Seoul (KR); Youngjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 371 days.

(21) Appl. No.: 16/104,376

(22) Filed: Aug. 17, 2018

(65) Prior Publication Data
US 2019/0054904 A1 Feb. 21, 2019

(30) Foreign Application Priority Data
Aug. 17, 2017 (KR) .................. 10-2017-0104328

(51) Int. Cl.
*B60T 7/22* (2006.01)
*B60T 8/171* (2006.01)
(Continued)

(52) U.S. Cl.
CPC ............. *B60T 7/22* (2013.01); *B60T 8/171* (2013.01); *G01S 13/865* (2013.01); *G01S 13/867* (2013.01); *G01S 13/931* (2013.01); *G01S 15/931* (2013.01); *G08G 1/165* (2013.01); *G08G 1/166* (2013.01); *B60T 2201/022* (2013.01); *B60T 2201/10* (2013.01); *B60T 2210/10* (2013.01); *B60T 2210/30* (2013.01); *B60T 2210/32* (2013.01); *B60T 2210/36* (2013.01); *B60T 2250/04* (2013.01); *G01S 13/10* (2013.01); *G01S 13/34* (2013.01); *G01S 17/931* (2020.01); *G01S 2013/93271* (2020.01)

(58) Field of Classification Search
CPC .... B60T 7/22; B60T 2250/04; B60T 2210/10; B60T 2210/30; B60T 8/171; B60T 2201/10; B60T 2201/022; B60T 2210/32; B60T 2210/36; B60T 8/17; B60T 8/1701; G01S 13/931; G01S 13/867; G01S 13/865; G01S 15/931; G01S 17/931; G01S 2013/93271; G01S 13/10; G01S 13/34; G08G 1/165; G08G 1/166; G08G 1/161; G08G 1/16; B60W 30/08
USPC ............ 701/41, 65, 70, 78, 93, 96, 110, 117
See application file for complete search history.

(56) References Cited

U.S. PATENT DOCUMENTS

| 10,636,226 B2 * | 4/2020 | An ...................... B60R 16/0236 |
| 2009/0207045 A1 * | 8/2009 | Jung .................. G06K 9/00798 340/932.2 |

(Continued)

*Primary Examiner* — Khoi H Tran
*Assistant Examiner* — B M M Hannan
(74) *Attorney, Agent, or Firm* — Birch, Stewart, Kolasch & Birch, LLP

(57) ABSTRACT

A driver assistance apparatus for a vehicle including an interface unit; and a processor that receives driving situation information and data about an object outside the vehicle through the interface unit, and determines an operation sensitivity of an autonomous emergency braking (AEB) operation corresponding to the object based on the received driving situation information, and generates control signal of the AEB operation to control a braking operation of the vehicle based on the determined operation sensitivity.

20 Claims, 19 Drawing Sheets

(51) Int. Cl.
  *G08G 1/16* (2006.01)
  *G01S 13/931* (2020.01)
  *G01S 13/86* (2006.01)
  *G01S 15/931* (2020.01)
  *G01S 13/10* (2006.01)
  *G01S 13/34* (2006.01)
  *G01S 17/931* (2020.01)

(56) References Cited

U.S. PATENT DOCUMENTS

| | | | | |
|---|---|---|---|---|
| 2010/0010715 A1* | 1/2010 | Inoue | B60T 7/22 | 701/51 |
| 2011/0190972 A1* | 8/2011 | Timmons | G08G 1/166 | 701/31.4 |
| 2015/0336547 A1* | 11/2015 | Dagan | B60T 7/22 | 701/70 |
| 2016/0016561 A1* | 1/2016 | Lee | G01S 13/867 | 701/70 |
| 2016/0144857 A1* | 5/2016 | Ohshima | G08G 1/04 | 701/23 |
| 2016/0231746 A1* | 8/2016 | Hazelton | B60W 30/00 | |
| 2016/0272172 A1* | 9/2016 | Lee | B60T 8/171 | |
| 2017/0101056 A1* | 4/2017 | Park | B60R 1/00 | |
| 2017/0113668 A1* | 4/2017 | Jeon | B60T 7/22 | |
| 2017/0364070 A1* | 12/2017 | Oba | G05D 1/0061 | |
| 2018/0032086 A1* | 2/2018 | Punithan | G05D 1/0295 | |
| 2018/0043819 A1* | 2/2018 | Kim | B60Q 1/24 | |
| 2018/0043896 A1* | 2/2018 | Lee | B60W 30/18145 | |
| 2018/0059683 A1* | 3/2018 | Cefkin | G05D 1/0088 | |
| 2018/0151074 A1* | 5/2018 | Noto | B60W 10/20 | |
| 2018/0173224 A1* | 6/2018 | Kim | G05D 1/0061 | |
| 2018/0268695 A1* | 9/2018 | Agnew | B60K 28/066 | |
| 2018/0357772 A1* | 12/2018 | Takemura | G06K 9/00369 | |
| 2019/0034742 A1* | 1/2019 | Gokan | B60T 7/12 | |
| 2020/0172122 A1* | 6/2020 | Mimura | G08G 1/16 | |

\* cited by examiner

VEHICLE DRIVER ASSISTANCE APPARATUS AND VEHICLE

CROSS-REFERENCE TO RELATED APPLICATION

This application claims priority to Korean Patent Application No. 10-2017-0104328, filed on Aug. 17, 2017 in the Korean Intellectual Property Office, the disclosure of which is incorporated herein by reference.

BACKGROUND OF THE INVENTION

1. Field of the Invention

The present invention relates to a vehicle driver assistance apparatus and a vehicle.

2. Description of the Related Art

A vehicle refers to an apparatus that a user drives in a desired direction. A typical example of the vehicle is an automobile. For convenience of vehicle users, the vehicle has increasingly been equipped with various sensors and electrical devices. In particular, for convenience of driving of users, studies on an advanced driver assistance system (ADAS) have been intensively conducted. Furthermore, an autonomous vehicle is in under active development.

In addition, an autonomous emergency braking (AEB) device has been applied to commercial vehicles as a vehicle driver assistance system. However, the AEB device may inconvenience a user in some cases. For example, when a vehicle travels in an alley in which pedestrians walk, normal traveling may not be performed due to operation of the AEB device.

SUMMARY OF THE INVENTION

Therefore, the present invention has been made in view of the above problems, and it is an object of the present invention to provide a vehicle driver assistance apparatus suitable for a driving situation.

Another object of the present invention is to provide a vehicle including the vehicle driver assistance apparatus.

The objects of the present invention are not limited to what has been particularly described hereinabove and other objects not described herein will be more clearly understood by persons skilled in the art from the following description.

In accordance with an aspect of the present invention, the above and other objects can be accomplished by the provision of a vehicle driver assistance apparatus including an object detection device configured to generate data about an object outside a vehicle, an interface unit, and a processor configured to receive driving situation information through the interface unit and determine an operation sensitivity of an autonomous emergency braking (AEB) device, corresponding to the object, based on the driving situation information.

Details of other embodiments are included in the following description and the drawings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
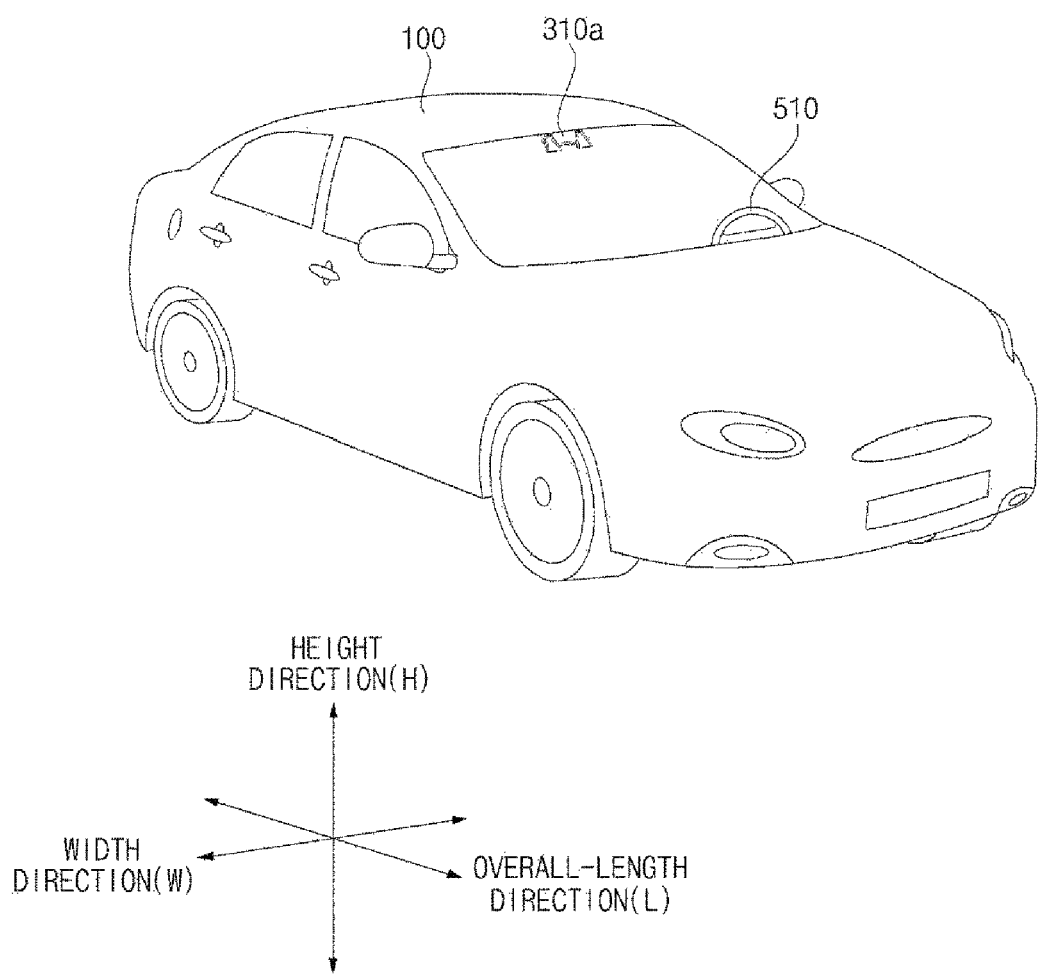
FIG. 1 is a view illustrating an outer appearance of a vehicle according to an embodiment of the present invention.
Figure 2:
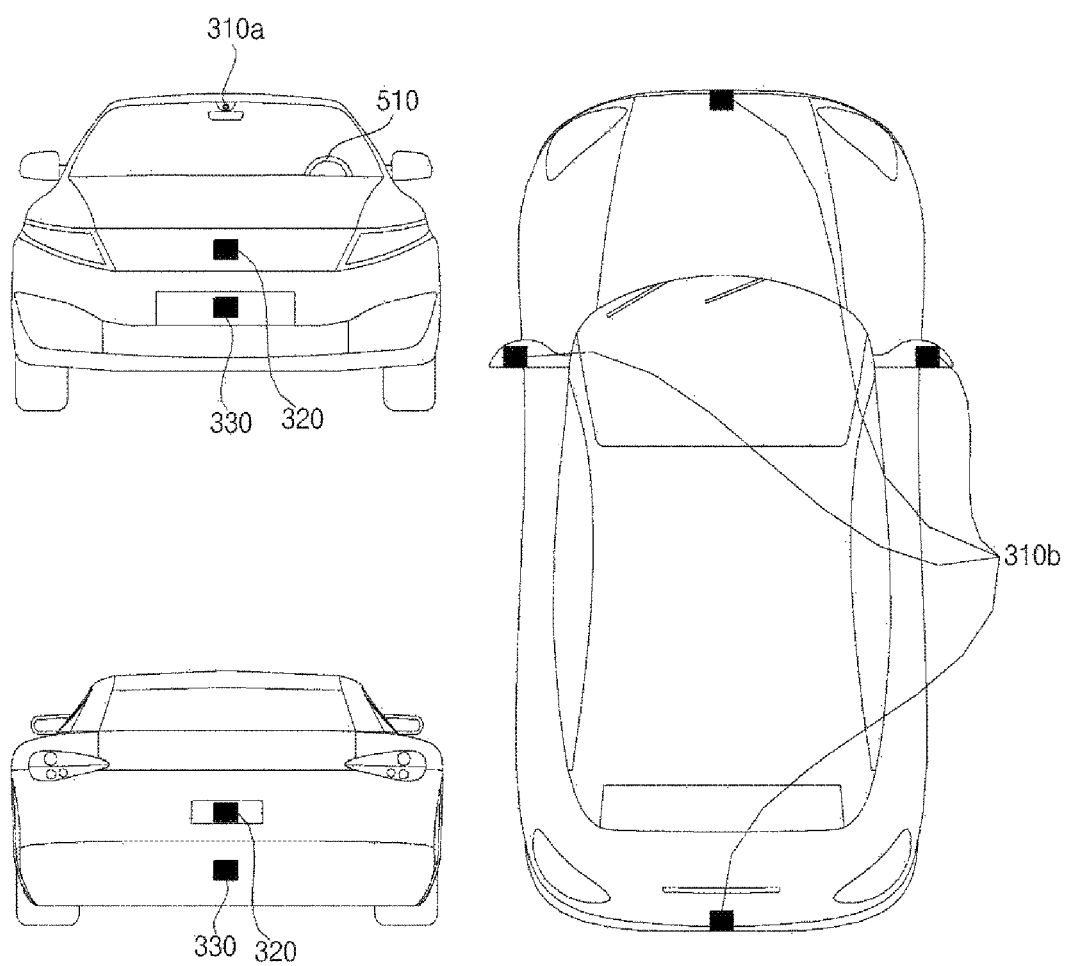
FIG. 2 is a view illustrating outer appearances of a vehicle seen at various angles from the exterior of the vehicle according to an embodiment of the present invention.
Figure 3:
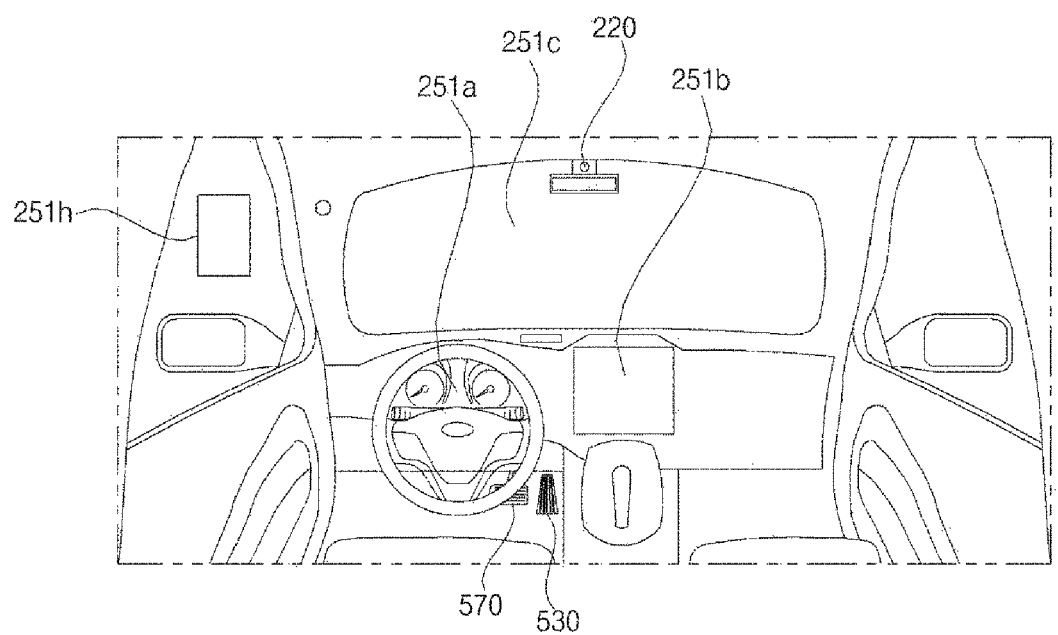
FIGS. 3 and 4 are views illustrating the interior of a vehicle according to an embodiment of the present invention.
Figure 4:
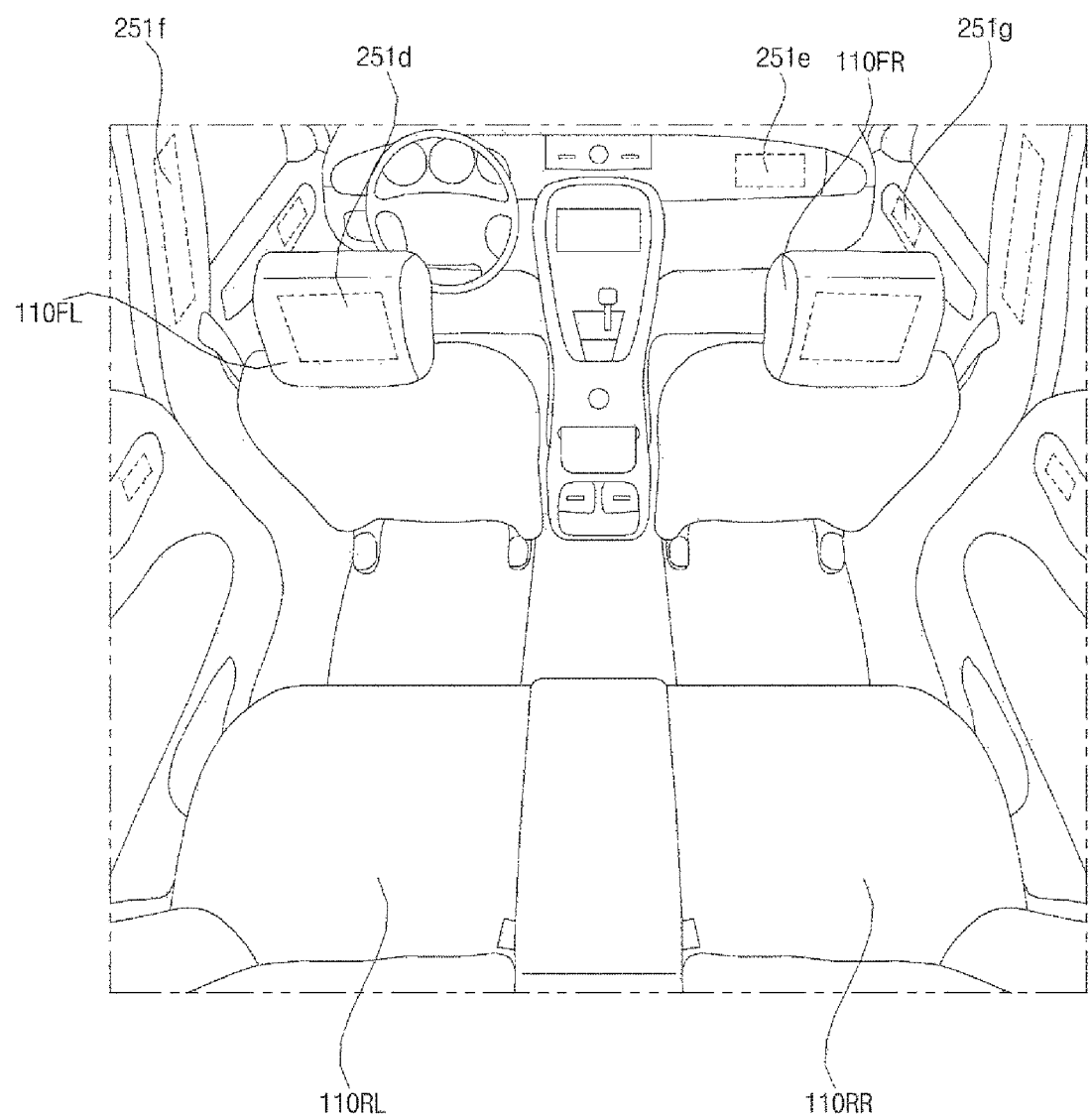

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given only in consideration of facilitation of description and do not have particular meanings or functions. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

Although the terms first, second, etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present. The singular form is intended to include the plural forms as well, unless context clearly indicates otherwise.

In the present application, it will be further understood that the terms "comprises", "includes", etc. specify the presence of stated features, numerals, steps, operations, elements, components, or combinations thereof, but do not preclude the presence or addition of one or more other features, numerals, steps, operations, elements, components, or combinations thereof. The term "vehicle" employed in this specification may include an automobile or a motorcycle. Hereinafter, description will be given mainly focusing on an automobile by way of example.

The vehicle described in this specification may include an internal combustion vehicle equipped with an engine as a power source, a hybrid vehicle equipped with both an engine and an electric motor as a power source, and an electric vehicle equipped with an electric motor as a power source. In the description below, the left side of the vehicle means the left side with respect to the traveling direction of the vehicle and the right side of the vehicle means the right side with respect to the traveling direction of the vehicle.

Referring to FIGS. 1 to 7, a vehicle 100 may include wheels rotated by a power source and a steering input device 510 for controlling a traveling direction of the vehicle 100. The vehicle 100 may be an autonomous vehicle. The vehicle 100 can be switched to an autonomous mode or a manual mode based on user input. For example, the vehicle 100 can be switched from the manual mode to the autonomous mode or from the autonomous mode to the manual mode, based on user input received through a user interface device 200.

The vehicle 100 can be switched to the autonomous mode or the manual mode based on driving situation information. The driving situation information may include at least one of vehicle external object information, navigation information, or vehicle state information. For example, the vehicle 100 can be switched from the manual mode to the autonomous mode or from the autonomous module to the manual mode, based on driving situation information generated by an object detection device 300. In another example, the vehicle 100 can be switched from the manual mode to the autonomous mode or from the autonomous module to the manual mode, based on driving situation information received through a communication device 400.

The vehicle 100 can also be switched from the manual mode to the autonomous mode or from the autonomous module to the manual mode, based on information, data, or a signal provided by an external device. When the vehicle 100 is driven in the autonomous mode, the autonomous vehicle 100 can be driven based on an operation system 700. For example, the autonomous vehicle 100 can be driven based on information, data, or a signal generated by a traveling system 710, a parking exit system 740, and a parking system 750.

When the vehicle 100 is driven in the manual mode, the autonomous vehicle 100 can receive user input for driving through a driving manipulation device 500. The vehicle 100 can be driven based on user input received through the driving manipulation device 500.

In addition, an overall length refers to a length from the front part to the rear part of a vehicle, an overall width refers to a width of the vehicle, and an overall height refers to a length from the bottom of a wheel to a roof of the vehicle. In the following description, an overall length direction L may mean a reference direction for measuring the overall length of the vehicle, an overall width direction W may mean a reference direction for measuring the overall width of the vehicle, and an overall height direction H may mean a reference direction for measuring the overall height of the vehicle.

Figure 7:
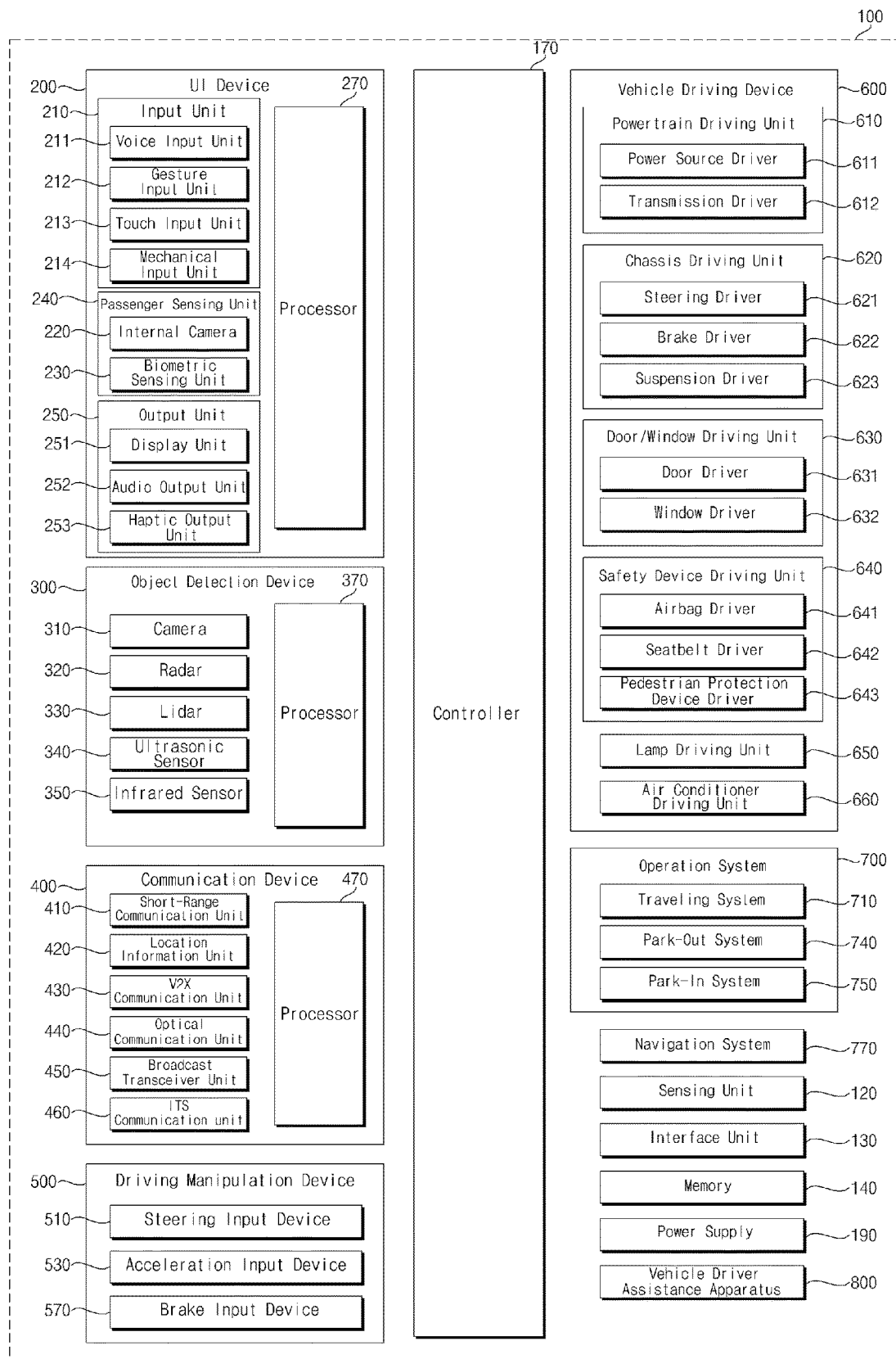
FIG. 7 is a block diagram of a vehicle referred to in explaining a vehicle according to an embodiment of the present invention.

As illustrated in FIG. 7, the vehicle 100 may include the user interface device 200, the object detection device 300, the communication device 400, the driving manipulation device 500, a vehicle driving device 600, the operation system 700, a navigation system 770, a sensing unit 120, an interface unit 130, a memory 140, a controller 170, a power supply 190, and a vehicle driver assistance apparatus 800.

The vehicle 100 may further include new components in addition to the components described in the present disclosure or may not include a part of the described components. Further, the user interface device 200 is a device used to enable the vehicle 100 to communicate with a user and can receive user input and provide information generated by the vehicle 100 to the user. The vehicle 100 can also implement user interfaces or user experience (UX) through the user interface device 200.

The user interface device 200 may include an input unit 210, an internal camera 220, a biometric sensing unit 230, an output unit 250, and a processor 270. The user interface device 200 may further include new components in addition to the above-described components or may not include a part of the above-described components.

The input unit 210 is configured to receive information from a user, and data collected by the input unit 210 can be analyzed by the processor 270 and processed as a control command from the user. The input unit 210 can be disposed inside the vehicle 100 can be disposed such as in an area of a steering wheel, an area of an instrument panel, an area of a seat, an area of each pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214. The voice input unit 211 can convert voice input of the user into an electrical signal, and the converted electrical signal can be provided to the processor 270 or the controller 170. The voice input unit 211 may also include one or more microphones.

Further, the gesture input unit 212 can convert gesture input of the user into an electrical signal, and the electrical signal can be provided to the processor 270 or the controller 170. The gesture input unit 212 may include at least one of an infrared sensor or an image sensor, for sensing gesture input of the user. In addition, the gesture input unit 212 can sense three-dimensional (3D) gesture input of the user. For this purpose, the gesture input unit 212 may include a light output unit for emitting a plurality of infrared rays or a plurality of image sensors.

Further, the gesture input unit 212 can sense 3D gesture input of the user by time of flight (ToF), structured light, or disparity. The touch input unit 213 can convert touch input of the user into an electrical signal. The electrical signal can be provided to the processor 270 or the controller 170. The touch input unit 213 may include a touch sensor for sensing touch input of the user.

In addition, a touchscreen may be configured by integrating the touch input unit 213 with a display unit 251. This touchscreen can provide both an input interface and an output interface between the vehicle 100 and the user. The mechanical input unit 214 may include at least one of a button, a dome switch, a jog wheel, or a jog switch. An electrical signal generated by the mechanical input unit 214 can be provided to the processor 270 or the controller 170.

The mechanical input unit 214 can be disposed on a steering wheel, a center fascia, a center console, a cockpit module, a door, or the like. The internal camera 220 can acquire a vehicle interior image and the processor 270 can sense a state of the user based on the vehicle interior image. The processor 270 can also acquire gaze information of the user from the vehicle interior image and sense a gesture of the user based on the vehicle interior image.

The biometric sensing unit 230 can acquire biometric information about the user. The biometric sensing unit 230 may include a sensor for acquiring biometric information about the user and acquire information about a fingerprint and heart rate, using the sensor. The biometric information can be used to authenticate the user.

The output unit 250 can generate a visual output, an acoustic output, or a haptic output. The output unit 250 may include at least one of the display unit 251, an audio output unit 252, or a haptic output unit 253. The display unit 251 can display graphical objects corresponding to various pieces of information. The display unit 251 may include at least one of a liquid crystal display (LCD), an organic light emitting diode (OLED) display, a flexible display, a 3D display, or an e-ink display.

A touchscreen may be configured by forming a multilayered structure with the display unit 251 and the touch input unit 213 or integrating the display unit 251 with the touch input unit 213. The display unit 251 may be configured as a head up display (HUD). If the display is configured as a HUD, the display unit 251 can be provided with a projection module and can output information through an image projected onto a windshield or a window. The display unit 251 may include a transparent display such as one attached to a windshield or a window.

The transparent display may have specific transparency and display an image on a specific screen. To have transparency, the transparent display may include at least one of a transparent thin film electroluminescent (TFEL) display, a transparent OLED display, a transparent LCD, a transmissive transparent display, or a transparent LED display. The transparency of the transparent display is controllable.

In addition, the user interface device 200 may include a plurality of display units 251a to 251g. As shown, the display unit 251 can be disposed in an area of a steering wheel, areas 251a, 251b, and 251e of an instrument panel, an area 251d of a seat, an area 251f of each pillar, an area 251g of a door, an area of a center console, an area of a head lining, or an area of a sun visor or may be implemented in an area 251c of the windshield, and an area 251h of a window.

Further, the audio output unit 252 converts an electrical signal received from the processor 270 or the controller 170 into an audio signal and outputs the audio signal. For this purpose, the audio output unit 252 may include one or more speakers. In addition, the haptic output unit 253 generates a haptic output. For example, the haptic output unit 253 can vibrate a steering wheel, a safety belt, and/or seats 110FL, 110FR, 110RL, and 110RR, so that a user may perceive the output.

The processor 270 can provide overall control to each unit of the user interface device 200. In addition, the user interface device 200 may include a plurality of processors 270 or may not include the processor 270. If the user interface device 200 does not include the processor 270, the user interface device 200 can operate under the control of a processor of another device in the vehicle 100 or under the control of the controller 170.

Further, the user interface device 200 may be referred to as a vehicle display device and can operate under the control of the controller 170. Also, the object detection device 300 can detect an object outside the vehicle 100 and generate object information based on sensing data.

The object information may include information as to whether an object is present, location information about the object, distance information between the vehicle 100 and the object, and relative speed information between the vehicle 100 and the object. The object may also be any of various items related to driving of the vehicle 100.

Figure 5:
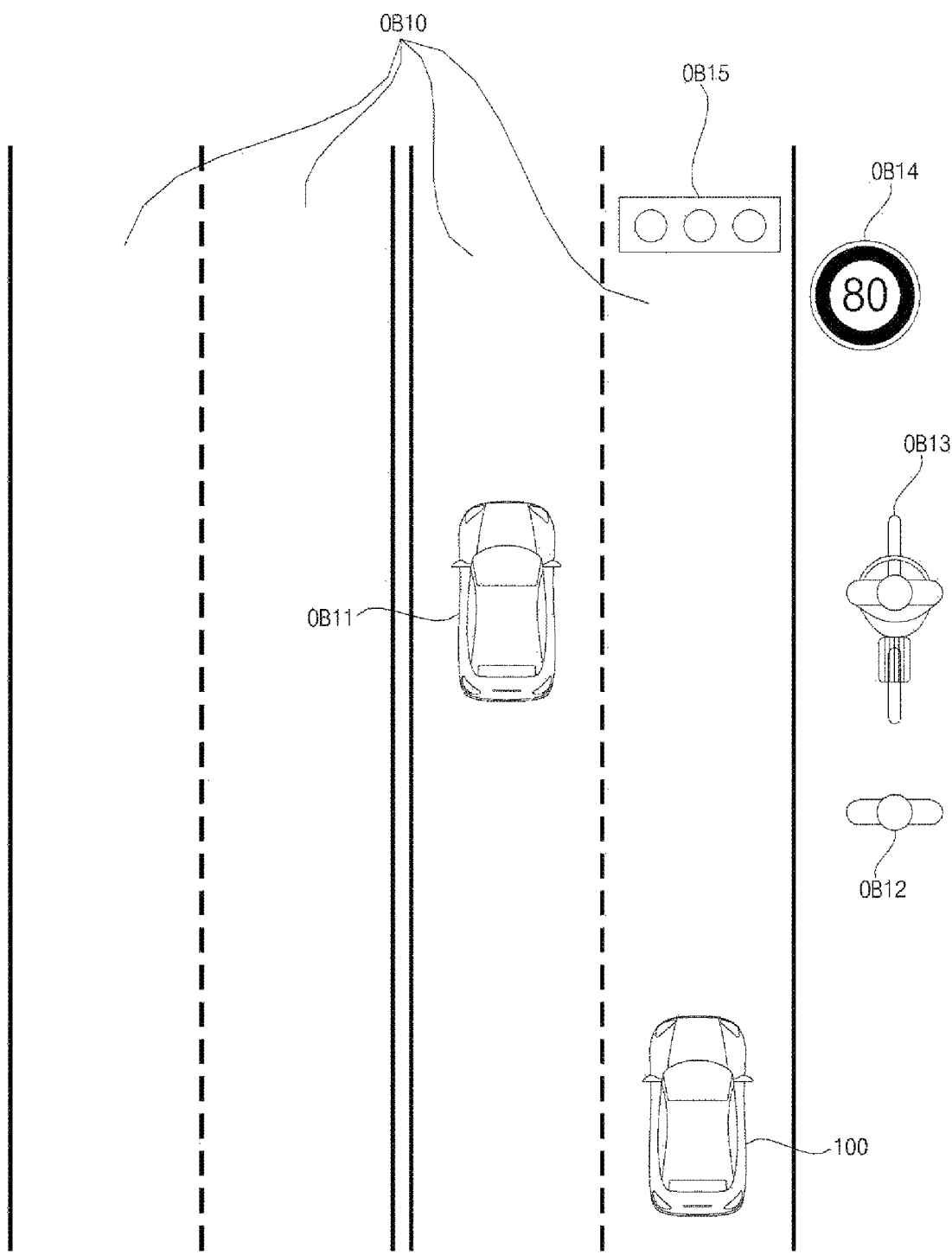
FIGS. 5 and 6 are views referred to in explaining objects according to an embodiment of the present invention.
Figure 6:
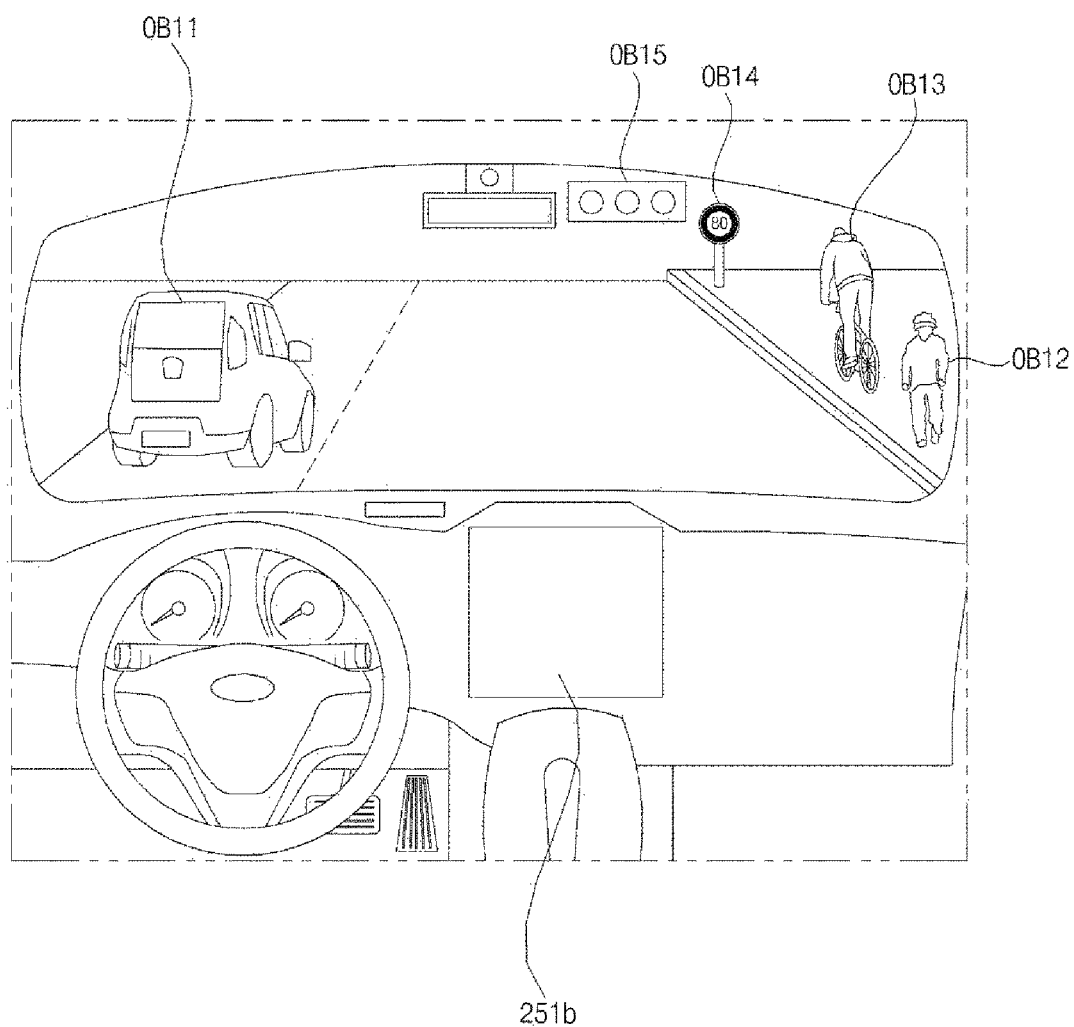

Referring to FIGS. 5 and 6, objects O may include lanes OB10, another vehicle OB11, a pedestrian OB12, a 2-wheel vehicle OB13, traffic signals OB14 and OB15, a road, a structure, a speed bump, topography, an animal, and so on. The lanes OB10 may include a driving lane, a lane next to the driving lane, and a lane in which an oncoming vehicle is traveling. The lanes OB10 may conceptually include left and right lines that define each of the lanes. The lanes OB10 may conceptually include a crossroad.

The other vehicle OB11 may be a vehicle traveling in the vicinity of the vehicle 100. The other vehicle OB11 may be located within a predetermined distance from the vehicle 100. For example, the other vehicle OB11 may precede or follow the vehicle 100. The pedestrian OB12 may be a person located around the vehicle 100. The pedestrian OB12 may be a person located within a predetermined distance from the vehicle 100. For example, the pedestrian OB12 may be a person on a sidewalk or a roadway.

The 2-wheel vehicle OB13 may refer to a transportation means moving on two wheels, located around the vehicle 100. The 2-wheel vehicle OB13 may be a transportation means having two wheels, located within a predetermined distance from the vehicle 100. For example, the 2-wheel vehicle OB13 may be a motorbike or bicycle on a sidewalk or a roadway.

The traffic signals OB14 and OB15 may include a traffic signal lamp OB15, a traffic sign OB14, and a symbol or text drawn or written on a road surface. Light may be light generated by a lamp of the other vehicle OB11. The light may be generated by a street lamp. The light may be sunlight. The road may include a road surface, a curve, a slope such as a downhill slope or an uphill slope, and so on.

The structure may be an object fixed to the ground, near to a road. For example, the structure may be any of a street lamp, a street tree, a building, a utility pole, a signal lamp, a bridge, a curb, and a guard rail. The topography may include a mountain, a hill, and the like.

In addition, objects may be classified into mobile objects and stationary objects. For example, the mobile objects may conceptually include another mobile vehicle and a mobile pedestrian. Also, the stationary objects may conceptually include a traffic signal, a road, a structure, a stationary vehicle, and a stationary pedestrian. The object detection device 300 may include a camera 310, a radar 320, a lidar 330, an ultrasonic sensor 340, an infrared sensor 350, and a processor 370.

In addition, the object detection device 300 may further include new components in addition to the above-described components or may not include a part of the above-described components. To capture an image of an exterior image of a vehicle, the camera 310 can be disposed at an appropriate position on the exterior of the vehicle 100. The camera 310 may be a mono camera, a stereo camera 310a, an around view monitoring (AVM) camera 310b, or a 360-degree camera.

Further, the camera 310 can acquire location information of an object, distance information between the vehicle 100 and the object, or relative speed information between the vehicle 100 and the object, using various image processing algorithms. For example, the camera 310 can acquire the distance information and relative speed information between the vehicle 100 and the object, based on variation in the size of the object over time from the captured image.

The camera 310 can also acquire the distance information and the relative speed information between the vehicle 100 and the object, through pin hole modeling and road surface profiling. For example, to capture an image of the front side of the vehicle 100, the camera 310 can be disposed in the vicinity of a windshield inside the vehicle 100. Alternatively, the camera 310 can be disposed around a front bumper or a radiator grill.

Also, to capture an image of the rear of the vehicle 100, the camera 310 can be disposed in the vicinity of a rear window inside the vehicle 100. Alternatively, the camera 310 can be disposed around a rear bumper, a trunk, or a tailgate. In addition, to capture an image of the lateral side of the vehicle 100, the camera 310 can be disposed in the vicinity of at least one of side windows inside the vehicle 100. Alternatively, the camera 310 can be disposed around a side mirror, a fender, or a door. The camera 310 can also provide the captured image to the processor 370.

The radar 320 may include an electromagnetic wave transmitter and an electromagnetic wave receiver and be implemented by a pulse radar or continuous wave radar scheme as an electromagnetic emission principle. The radar 320 may be implemented by frequency modulated continuous wave (FMCW) or frequency shift keying (FSK) according to a signal waveform in the continuous wave radar scheme.

The radar 320 can detect an object by a TOF or phase shifting scheme using electromagnetic waves as a medium and determine the distance and relative speed between the vehicle 100 and the detected object. The radar 320 can be disposed at an appropriate position on the exterior of the vehicle 100 in order to sense an object ahead of, behind, or beside the vehicle 100.

The lidar 330 may include a laser transmitter and a laser receiver and be implemented by a TOF or phase shifting scheme. The lidar 330 may be implemented in a driven or non-driven manner. If the lidar 330 is implemented in a driven manner, the lidar 330 can be rotated by a motor and can detect an object around the vehicle 100.

If the lidar 330 is implemented in a non-driven manner, the lidar 330 can detect an object within a predetermined range from the vehicle 100 by optical steering. The vehicle 100 may also include a plurality of non-driven lidars 330. The lidar 330 can detect an object using a TOF or phase shifting scheme via laser light as a medium and determine the location of the detected object, and the distance and relative speed between the vehicle 100 and the detected object. Further, the lidar 330 can be disposed at an appropriate position on the exterior of the vehicle 100 in order to sense an object ahead of, behind, or beside the vehicle 100.

The ultrasonic sensor 340 may include an ultrasonic wave transmitter and an ultrasonic wave receiver. The ultrasonic sensor 340 can detect an object based on ultrasonic waves and determine the location of the detected object and the distance and relative speed between the vehicle 100 and the detected object. The ultrasonic sensor 340 can also be disposed at an appropriate position on the exterior of the vehicle 100 in order to sense an object ahead of, behind, or beside the vehicle 100.

The infrared sensor 350 may include an infrared transmitter and an infrared receiver and can detect an object using infrared light and determine the location of the detected object and the distance and relative speed between the vehicle 100 and the detected object. The infrared sensor 350 can be disposed at an appropriate position on the exterior of the vehicle 100 in order to sense an object ahead of, behind, or beside the vehicle 100.

Further, the processor 370 can provide overall control to each unit of the object detection device 300. The processor 370 can detect or classify an object by comparing data sensed by the camera 310, the radar 320, the lidar 330, the ultrasonic sensor 340, and the infrared sensor 350 with prestored data. The processor 370 can also detect an object and track the detected object, based on a captured image. In addition, the processor 370 can perform operations including calculation of the distance to the object and calculation of a relative speed between the vehicle 100 and the object, by an image processing algorithm.

For example, the processor 370 can acquire the distance information and relative speed information between the vehicle 100 and the object, based on variation in the size of the object over time from the captured image. For example, the processor 370 can acquire the distance information and relative speed information between the vehicle 100 and the object, through pin hole modeling and road surface profiling. Also, the processor 370 can acquire the distance information and relative speed information between the vehicle 100 and the object, based on disparity information from a stereo image captured by the stereo camera 310*a*.

The processor 370 can detect an object and track the detected object based on reflected electromagnetic waves which return after transmitted electromagnetic waves are reflected from an object. In addition, the processor 370 can perform operations including calculation of the distance to the object and the relative speed between the vehicle 100 and the object, based on the electromagnetic waves.

The processor 370 can also detect an object and track the detected object based on reflected laser light which returns after transmitted laser light is reflected from an object. The processor 370 can perform operations including calculation of the distance to the object and the relative speed between the vehicle 100 and the object, based on the laser light. The processor 370 can detect an object and track the detected object based on reflected ultrasonic waves which returns after transmitted ultrasonic waves are reflected from an object, and perform operations including calculation of the distance to the object and the relative speed between the vehicle 100 and the object, based on the ultrasonic waves.

Further, the processor 370 can detect an object and track the detected object based on reflected infrared light which returns after transmitted infrared light is reflected from an object. The processor 370 can perform operations including calculation of the distance to the object and the relative speed between the vehicle 100 and the object, based on the infrared light.

In addition, the object detection device 300 may include a plurality of processors 370 or may not include the processor 370. For example, each of the camera 310, the radar 320, the lidar 330, the ultrasonic sensor 340, and the infrared sensor 350 may include a processor individually. If the processor 370 is not included in the object detection device 300, the object detection device 300 can operate under the control of a processor of a device in the vehicle 100 or under the control of the controller 170.

The object detection device 300 can operate under control of the controller 170. In addition, the communication device 400 is used to communicate with an external device. The external device may be another vehicle, a mobile terminal, or a server, and the communication device 400 may include at least one of a transmission antenna or a reception antenna, for communication, and a radio frequency (RF) circuit and RF device, for implementing various communication protocols.

The communication device 400 may include a short-range communication unit 410, a location information unit 420, a V2X communication unit 430, an optical communication unit 440, a broadcast transceiver unit 450, an intelligent transport system (ITS) communication unit 460, and a processor 470. In addition, the communication device 400 may further include new components in addition to the above-described components, or may not include a part of the above-described components.

The short-range communication module 410 may support short-range communication, using at least one of Bluetooth™, radio frequency identification (RFID), infrared data association (IrDA), ultra-wideband (UWB), ZigBee, near field communication (NFC), wireless fidelity (Wi-Fi), Wi-Fi Direct, or wireless universal serial bus (Wireless USB). The short-range communication unit 410 may conduct short-range communication between the vehicle 100 and at least one external device by establishing a wireless area network.

The location information unit 420 can acquire information about a location of the vehicle 100 and may include a global positioning system (GPS) module or a differential global positioning system (DGPS) module. The V2X communication unit 430 is used for wireless communication with a server (by vehicle-to-Infrastructure (V2I)), another vehicle (by vehicle-to-Vehicle (V2V)), or a pedestrian (by vehicle-to-pedestrian (V2P)). The V2X communication unit 430 may include an RF circuit capable of implementing a V2I protocol, a V2V protocol, and a V2P protocol.

The optical communication unit 440 is used to communicate with an external device by light and may include an optical transmitter for converting an electrical signal into an optical signal and radiating the optical signal to the outside and an optical receiver for converting a received optical signal into an electrical signal. In addition, the optical transmitter may be integrated with a lamp included in the vehicle 100.

The broadcast transceiver unit 450 is used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 can exchange information, data, or a signal with a traffic system and provide the acquired information, data, and signal to the traffic system. The ITS communication unit 460 can receive the information, data, and signal from the traffic system. For example, the ITS communication unit 460 can receive road traffic information from the traffic system and provide the received road traffic information to the controller 170. In another example, the ITS communication unit 460 can receive a control signal from the traffic system and provide the control signal to the controller 170 or a processor included in the vehicle 100.

Further, the processor 470 can provide overall control to each unit of the communication device 400. In addition, the communication device 400 may include a plurality of processors 470 or may not include the processor 470. If the communication device 400 does not include the processor 470, the communication device 400 can operate under the control of a processor of another device in the vehicle 100 or under the control of the controller 170.

Also, the communication device 400 may be configured as a vehicle display device, together with the user interface device 200. In this instance, the vehicle display device may be referred to as a telematics device or an audio video navigation (AVN) device. Also, the communication device 400 can operate under the control of the controller 170.

In addition, the driving manipulation device 500 is used to receive a user command for driving the vehicle 100. In the manual mode, the vehicle 100 can drive based on a signal provided by the driving manipulation device 500. The driving manipulation device 500 may include the steering input device 510, an acceleration input device 530, and a brake input device 570.

Further, the steering input device 510 can receive a user command for steering the vehicle 100 from a user, and is desirably configured as a wheel for enabling a steering input by rotation. In addition, the steering input device 510 can be configured as a touchscreen, a touchpad, or a button.

The acceleration input device 530 can receive a user command input for acceleration of the vehicle 100 from the user, and the brake input device 570 can receive a user command for deceleration of the vehicle 100 from the user. The acceleration input device 530 and the brake input device 570 may be formed into pedals. In addition, the acceleration input device 530 or the brake input device 570 can be configured as a touchscreen, a touchpad, or a button.

Further, the driving manipulation device 500 can operate under the control of the controller 170. Also, the vehicle driving device 600 is used to electrically control driving of various devices of the vehicle 100. The vehicle driving device 600 may include at least one of a powertrain driving unit 610, a chassis driving unit 620, a door/window driving unit 630, a safety device driving unit 640, a lamp driving unit 650, or an air conditioner driving unit 660.

In addition, the vehicle driving device 600 may further include new components in addition to the above-described components or may not include a part of the above-described components. The vehicle driving device 600 may also include a processor. Each unit of the vehicle driving device 600 may include a processor individually.

The powertrain driving unit 610 can control operation of a powertrain and may include a power source driver 611 and a transmission driver 612. The power source driver 611 can control a power source of the vehicle 100. For example, if the power source is a fossil fuel-based engine, the power source driver 611 can perform electronic control of the engine. Therefore, the power source driver 611 can control an output torque of the engine, and the like. The power source driver 611 can also adjust the engine output torque under the control of the controller 170.

For example, if the power source is an electrical energy-based motor, the power source driver 610 can control the motor and can adjust a rotation speed, torque, and so on of the motor under the control of the controller 170. The transmission driver 612 can control a transmission and adjust a state of the transmission. The transmission driver 612 can adjust the state of the transmission to drive D, reverse R, neutral N, or park P. If the power source is an engine, the transmission driver 612 can adjust an engagement state of a gear in the drive state D.

The chassis driving unit 620 can control operation of a chassis device. The chassis driving unit 620 may include a steering driver 621, a brake driver 622, and a suspension driver 623. The steering driver 621 can perform electronic control of a steering device in the vehicle 100. The steering driver 621 can steer the vehicle 100, and the brake driver 622 can perform electronic control of a brake device in the vehicle 100. For example, the brake driver 622 can decrease the speed of the vehicle 100 by controlling an operation of a brake disposed at a wheel.

Meanwhile, the brake driver 622 can control a plurality of brakes individually and can differentiate braking power applied to a plurality of wheels. Further, the suspension driver 623 can perform electronic control of a suspension device in the vehicle 100. For example, if the surface of a road is uneven, the suspension driver 623 can control the suspension device to reduce vibration of the vehicle 100. The suspension driver 623 can also control a plurality of suspensions individually.

The door/window driving unit 630 can perform electronic control on a door device or a window device in the vehicle 100. The door/window driving unit 630 may include a door driver 631 and a window driver 632. The door driver 631 can perform electronic control on a door device in the vehicle 100. The door driver 631 can control opening and closing of a plurality of doors in the vehicle 100. The door driver 631 can control opening or closing of the trunk or the tailgate and control opening or closing of the sunroof.

The window driver 632 can perform electronic control on a window device in the vehicle 100 and control opening or closing of a plurality of windows in the vehicle 100. The safety device driving unit 640 can perform electronic control on various safety devices in the vehicle 100, and may include an airbag driver 641, a seatbelt driver 642, and a pedestrian protection device driver 643.

In addition, the airbag driver 641 can perform electronic control on an airbag device in the vehicle 100. For example, the airbag driver 641 can control inflation of an airbag, upon sensing an emergency situation. The seatbelt driver 642 can perform electronic control on a seatbelt device in the vehicle 100. For example, the seatbelt driver 642 can control securing of passengers on the seats 110FL, 110FR, 110RL, and 110RR by means of seatbelts, upon sensing danger.

The pedestrian protection device driver 643 can perform electronic control on a hood lift and a pedestrian airbag in the vehicle 100. For example, the pedestrian protection device driver 643 can control hood lift-up and deployment of the pedestrian airbag, upon sensing collision with a pedestrian.

In addition, the lamp driving unit 650 can perform electronic control on various lamp devices in the vehicle 100. The air conditioner driver 660 can perform electronic control on an air conditioner in the vehicle 100. For example, if a vehicle internal temperature is high, the air conditioner driver 660 can control the air conditioner to operate and supply cool air into the vehicle 100.

The vehicle driving device 600 may include a processor. Each unit of the vehicle driving device 600 may also include a processor individually. The vehicle driving device 600 can operate under the control of the controller 170. Further, the operation system 700 is a system that controls various operations of the vehicle 100. The operation system 700 can operate in the autonomous driving mode and may include a traveling system 710, a park-out system 740, and a park-in system 750.

In addition, the operation system 700 may further include new components in addition to the above-described components or may not include a part of the above-described components. Meanwhile, the operation system 700 may include a processor. Each unit of the operation system 700 may include a processor individually.

In addition, if the operation system 700 is implemented in software, the operation system 700 may conceptually be a lower-layer component of the controller 170. In addition, the operation system 700 may conceptually include at least one of the user interface device 200, the object detection device 300, the communication device 400, the driving manipulation device 500, the vehicle driving device 600, the navigation system 770, the sensing unit 120, or the controller 170.

The traveling system 710 can control traveling of the vehicle 100. The traveling system 710 can receive navigation information from the navigation system 770 and provide a control signal to the vehicle driving device 600, so that the vehicle 100 can travel.

In addition, the traveling system 710 can receive object information from the object detection device 300 and provide a control signal to the vehicle driving device 600, so that the vehicle 100 may travel. The traveling system 710 can also receive a signal from an external device through the communication device 400 and provide a control signal to the vehicle driving device 600, so that the vehicle 100 may travel.

The traveling system 710 may include at least one of the user interface device 270, the object detection device 300, the communication device 400, the driving manipulation device 500, the vehicle driving device 600, the navigation system 770, the sensing unit 120, or the controller 170 and may conceptually be a system for performing traveling of the vehicle 100. The traveling system 710 may be referred to as a vehicle traveling control device.

The park-out system 740 can perform park-out of the vehicle 100. The park-out system 740 can receive navigation information from the navigation system 770 and provide a control signal to the vehicle driving device 600, so that the vehicle 100 may leave. The park-out system 740 can also receive object information from the object detection device 300 and provide a control signal to the vehicle driving device 600, so that the vehicle 100 may leave.

In addition, the park-out system 740 can receive a signal from an external device through the communication device 400 and provide a control signal to the vehicle driving device 600, so that the vehicle 100 may leave. The park-out system 740 may include at least one of the user interface device 270, the object detection device 300, the communication device 400, the driving manipulation device 500, the vehicle driving device 600, the navigation system 770, the sensing unit 120, or the controller 170 and may conceptually be a system for performing park-out of the vehicle 100.

The park-out system 740 may be referred to as a vehicle park-out control device. The park-in system 750 can perform park-in of the vehicle 100. The park-in system 750 can receive navigation information from the navigation system 770 and provide a control signal to the vehicle driving device 600, so that the vehicle 100 may park.

The park-in system 750 can receive object information from the object detection device 300 and provide a control signal to the vehicle driving device 600, so that the vehicle 100 may park. In addition, the park-out system 740 can receive a signal from an external device through the communication device 400 and provide a control signal to the vehicle driving device 600, so that the vehicle 100 may park.

The park-out system 740 may include at least one of the user interface device 270, the object detection device 300, the communication device 400, the driving manipulation device 500, the vehicle driving device 600, the navigation system 770, the sensing unit 120, or the controller 170 and may conceptually be a system for performing park-in of the vehicle 100. The park-in system 750 may be referred to as a vehicle park-in control device.

The navigation system 770 can provide navigation information. The navigation information may include at least one of map information, set destination information, path information according to destination setting, information about various objects on a path, lane information, or information about a current location of a vehicle. The navigation system 770 may include a memory and a processor. Also, the memory can store navigation information, and the processor can control operation of the navigation system 770.

In addition, the navigation system 770 can receive information from an external device through the communication device 400 and update pre-stored information using the received information. In addition, the navigation system 770 may be classified as a lower-layer component of the user interface device 200.

The sensing unit 120 can sense a state of the vehicle 100. The sensing unit 120 may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a handle rotation-based steering sensor, a vehicle internal temperature sensor, a vehicle internal humidity sensor, an ultrasonic sensor, an illumination sensor, an accelerator pedal position sensor, a brake pedal position sensor, and the like. Meanwhile, the IMU sensor may include one or more of an acceleration sensor, a gyro sensor, and a magnetic sensor.

The sensing unit 120 can acquire sensing signals for vehicle posture information, vehicle motion information, vehicle yaw information, vehicle roll information, vehicle pitch information, vehicle collision information, vehicle heading information, vehicle location information (GPS information), vehicle angle information, vehicle speed information, vehicle acceleration information, vehicle inclination information, vehicle forward/reverse information, battery information, fuel information, tire information, vehicle lamp information, vehicle internal temperature information, vehicle internal humidity information, a steering wheel rotation angle, a vehicle external illuminance, a pressure applied to an accelerator pedal, a pressure applied to a brake pedal, and the like.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on. The sensing unit 120 generates vehicle state information based on sensing data. The vehicle state information may be information generated based on data sensed by various sensors included in a vehicle.

For example, the vehicle state information may include vehicle posture information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

The interface unit 130 provides paths to various types of external devices connected to the vehicle 100. For example, the interface unit 130 can be provided with a port connectable to a mobile terminal and may be connected to the mobile terminal through the port. In this instance, the interface unit 130 can exchange data with the mobile terminal.

In addition, the interface unit 130 serves as a path through which electric energy is supplied to a connected mobile terminal. If the mobile terminal is electrically connected to the interface unit 130, the interface unit 130 can supply electric energy received from the power supply 190 to the mobile terminal under the control of the controller 170.

Further, the memory 140 is electrically connected to the controller 170 and can store basic data for a unit, control data for controlling an operation of the unit, and input and output data. The memory 140 may be any of various hardware storage devices, such as a read-only memory (ROM), a random access memory (RAM), an erasable and programmable ROM (EPROM), a flash drive, and a hard drive. The memory 140 may store various data for overall operation of the vehicle 100, such as programs for processing or controlling the controller 170.

In addition, the memory 140 may be integrated with the controller 170 or configured as a lower-layer component of the controller 170. The controller 170 can control an overall operation of each unit in the vehicle 100 and may be referred to as an electronic control unit (ECU). The power supply 190 can supply power needed to operate each component under the control of the controller 170. Particularly, the power supply 190 can receive power from a battery within the vehicle 100.

One or more processors and the controller 170, included in the vehicle 100*m* may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or an electrical unit for executing other functions.

Figure 8:
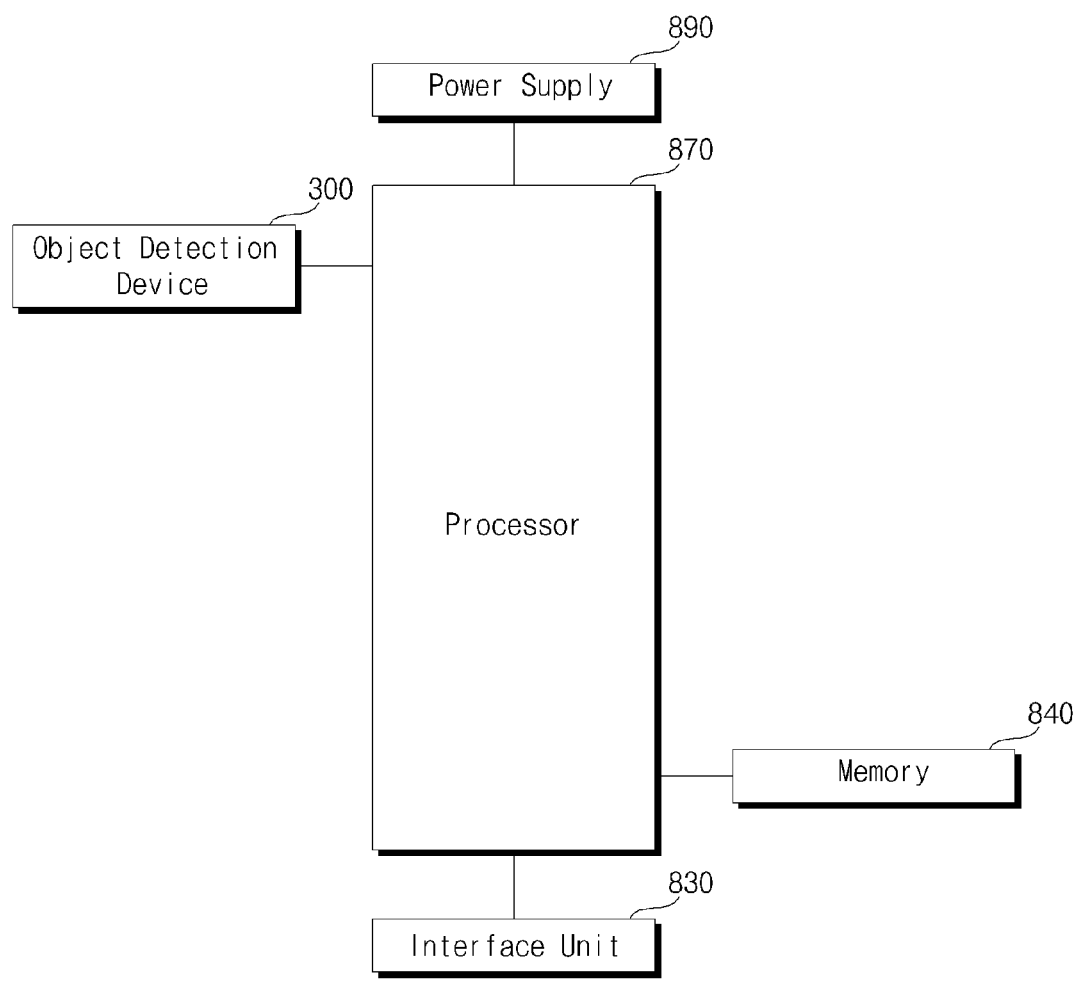
FIG. 8 is a diagram referred to in explaining a vehicle driver assistance apparatus according to an embodiment of the present invention.

Next, FIG. 8 is a diagram referred to in explaining a vehicle driver assistance apparatus according to an embodiment of the present invention. A vehicle driver assistance apparatus 800 may be referred to as an autonomous emergency braking (AEB) device. As shown, the driver assistance apparatus 800 may include the object detection device 300, an interface unit 830, a memory 840, a processor 870, and a power supply 890.

The object detection device 300 can generate data about an object outside the vehicle 100. The object detection device 300 can sense an object outside the vehicle 100 through at least one of the camera 310, the radar 320, the lidar 330, the ultrasonic sensor 340, or the infrared sensor 350 and generate sensing data. A description of the object detection device 300 given with reference to FIGS. 1 to 7 may be applied to the object detection device 300 illustrated in FIG. 8.

The interface unit 830 can exchange information, a signal, or data with other devices included in the vehicle 100. The interface unit 830 can transmit received information, a received signal, or received data to the processor 870. The interface unit 830 can transmit information, a signal, or data generated or processed by the processor 870 to other devices included in the vehicle 100. Further, the interface unit 830 can receive information, a signal, or data from other devices included in the vehicle 100, and can receive driving situation information.

The driving situation information may include at least one of driving environment information, vehicle external object information, navigation information, or vehicle state information. The interface unit 830 can receive at least one of vehicle location information, road type information indicating the type of a road on which a vehicle is traveling, section state information about a section in which a vehicle is traveling, timing information during traveling of a vehicle, or weather information from at least one of the communication device 400, the navigation system 770, the controller 170, or the memory 140.

The interface unit 830 can receive the vehicle state information from at least one of the sensing unit 120, the memory 140, or the controller 170. The interface unit 830 can receive driving speed information from the sensing unit 120 of the vehicle 100, and receive at least one of accumulated driving distance information or accumulated braking distance information from the memory 140 of the vehicle 100.

The interface unit 830 can exchange data with the user interface device 200, and transmit at least one of a signal, information, or data provided by the processor 870 to the user interface device 200. The interface unit 830 can receive at least one of a signal, information, or data from the user interface device 200 and provide at least one of the received signal, information, or data to the processor 870.

The memory 840 is electrically connected to the processor 870 and can store basic data for each unit of the vehicle driver assistance apparatus, control data for controlling operation of each unit, and input/output data. In hardware, the memory 840 may be various storage devices such as a ROM, a RAM, an EPROM, a flash drive, and a hard drive. The memory 840 may store various types of data for overall operation of the driver assistance apparatus 800, such as programs for processing or controlling the processor 870.

Further, the memory 840 may be integrated with the processor 870 or may be configured as a lower constituent element of the processor 870. The processor 870 may also be electrically connected to each unit of the vehicle driver assistance apparatus 800. The processor 870 can control overall operation of each unit of the vehicle driver assistance apparatus 800 and receive the driving situation information through the interface unit 830.

In addition, the driving situation information may include at least one of the navigation information, the driving environment information, or the vehicle state information. The navigation information may include the vehicle location information, the road type information indicating the type of a road on which a vehicle is traveling, and the section state information about a section in which a vehicle is traveling.

Further, the driving environment information may include the timing information during traveling of a vehicle and the weather information during traveling of a vehicle. The vehicle state information may include the driving speed information of the vehicle 100, the accumulated driving distance information of the vehicle 100, and the accumulated braking distance information of the vehicle 100.

The processor 270 can determine an operation sensitivity of an AEB device corresponding to an object, based on the driving situation information. The operation sensitivity may be a control parameter defined by at least one of the start of a braking operation, the end of the braking operation, or a degree of braking force.

The processor 270 can determine a braking operation start condition of the AEB device and a degree of a braking operation of the AEB device, which correspond to an object, based on the driving situation information. For example, the processor 270 can determine a reference value of a time to collision (TTC), based on the driving situation information. The processor 270 can also determine at least one of a braking distance, a braking time, a braking speed, or a braking force, based on the driving situation information.

Further, the processor 870 can receive the navigation information through the interface unit 830 and determine the operation sensitivity of the AEB device, based on the navigation information. The processor 270 can also receive the vehicle location information through the interface unit 830, and determine the operation sensitivity of the AEB device, based on the vehicle location information.

In addition, the processor 270 can acquire the type information indicating the type of a road on which a vehicle is traveling, based on the vehicle location information. The processor 270 can determine the operation sensitivity of the AEB device, based on the road type information. A road may be classified into a vehicle exclusive road, a road with a sidewalk next to it, and a road on which vehicles and pedestrians pass. For example, upon determining that the vehicle 100 is traveling on a road on which vehicles and pedestrians pass, the processor 270 can determine the operation sensitivity of the AEB device to be lower than when the vehicle travels on the other roads. In this instance, the processor 870 can relatively reduce the reference value of the TTC and set a braking force to be relatively low.

Thus, inconvenience caused by a phenomenon in which traveling is not performed due to frequent autonomous braking can be solved by lowering the operation sensitivity on a road on which vehicles and pedestrians pass. In addition, the processor 270 can acquire the section state information about a section in which a vehicle travels, based on the vehicle location information and determine the operation sensitivity, based on the section state information.

The section state information may include at least one of information as to whether a section is a slope section, information as to whether a section is a curved section, information as to whether an accident has occurred in a section, or information as to whether a section is under construction. For example, if a vehicle is traveling on at least one of the slope section, the curved section, the accident occurrence section, or a construction progress section, the processor 270 can set the operation sensitivity of the AEB device to be relatively high. In this instance, the processor 870 can set the reference value of the TTC to be relatively high and the braking force to be relatively high.

In this way, occurrence of an accident can be minimized during occurrence of an emergency situation by raising the operation sensitivity of the AEB device in the slope section, the curved section, the accident occurrence section, or a construction progress section.

Further, the processor 870 can receive the driving environment information through the interface unit 830 and determine the operation sensitivity of the AEB device, based on the driving environment information. The processor 870 can also acquire the timing information during traveling of a vehicle through the interface unit 830 and determine the operation sensitivity of the AEB device, based on the timing information.

For example, the processor 870 can acquire information as to whether a timing when a vehicle is traveling is daytime or nighttime, through the interface unit 830, and set the operation sensitivity of the AEB device based on the information as to whether a timing when a vehicle is traveling is daytime or nighttime. In another example, the processor 870 can set the operation sensitivity of the AEB device while the vehicle 100 travels during the daytime to be lower than while the vehicle 100 travels at night. For example, the processor 870 can set the operation sensitivity of the AEB device to be higher while the vehicle 100 travels at night than while the vehicle 100 travels during the daytime.

The processor 870 can acquire the weather information during traveling of a vehicle through the interface unit 830 and determine the operation sensitivity of the AEB device based on the weather information. For example, the processor 870 can set the operation sensitivity of the AEB while the vehicle 100 travels when it is snowing or raining to be higher than while the vehicle 100 travels when it is sunny.

The processor 870 can also receive the vehicle state information through the interface unit 830 and determine the operation sensitivity of the AEB device based on the vehicle state information. The processor 870 can receive the vehicle driving speed information through the interface unit 830.

In addition, the processor 870 can determine the operation sensitivity of the AEB device based on the vehicle driving speed information. For example, the processor 870 can set the operation sensitivity of the AEB device when the vehicle 100 travels at a low speed to be lower than when the vehicle 100 travels at a high speed.

Further, the processor 870 can receive the accumulated driving distance information through the interface unit 830 and determine the operation sensitivity of the AEB device based on the accumulated driving distance information. For example, the processor 870 can set the operation sensitivity of the AEB device when an accumulated driving distance is above a reference distance to be higher than when the accumulated driving distance is less than the reference distance.

In addition, the processor 870 can predict the state of a tire based on the accumulated driving distance information. The processor 870 may indirectly determine the operation sensitivity of the AEB device according to the state of the tire by determining the operation sensitivity of the AEB device based on accumulated driving distance information.

Further, the accumulated driving distance can be reset after the tire is exchanged. The processor 870 can receive the accumulated braking distance information of a vehicle through the interface unit 830 and determine the operation sensitivity of the AEB device based on the accumulated braking distance information. For example, the processor 870 can set the operation sensitivity of the AEB device when an accumulated braking distance is above a reference distance to be higher than when the accumulated braking distance is less than the reference distance.

The processor 870 can also predict a brake pad abrasion state based on the accumulated braking distance information and indirectly determine the operation sensitivity of the AEB device according to the brake pad abrasion state by determining the operation sensitivity of the AEB device based on the accumulated braking distance information.

In addition, the accumulated braking distance can be reset after the brake pad is exchanged. The processor 870 can determine the operation sensitivity of the AEB device based on data about an object and determine whether a moving object located within a set distance is present, based on the data about an object.

The processor 870 can also determine the operation sensitivity of the AEB device based further on whether a moving object located within a set distance is present and determine the number of moving objects located within the set distance, based on the data about an object.

In addition, the processor 870 can determine the operation sensitivity of the AEB device based further on the number of moving objects. For example, a moving object may include a pedestrian. The processor 870 can control the operation sensitivity of the AEB device to be reduced as the number of pedestrians is increased. Thus, inconvenience caused by a phenomenon in which traveling is not performed due to frequent autonomous braking can be solved by lowering the operation sensitivity of the AEB device as the number of pedestrians is increased.

Further, the processor 870 can exchange at least one of a signal, data, or information with the user interface device 200 through the interface unit 830. The processor 870 can provide the user interface device 200 with information about an object which is an operation cause of the AEB device through the interface unit 830.

The user interface device 200 can output the information about an object which is an operation cause of the AEB device through at least one of a visual scheme, an acoustic scheme, or a haptic scheme. Also, the processor 870 can provide the user interface device 200 with information about a sensing range of the object detection device 300 through the interface unit 830. Herein, the sensing range of the object detection device 300 may be a range for detecting an object which is a basis of operation of the AEB device.

The user interface device 200 can output the information about the sensing range of the object detection device 300 through at least one of a visual scheme, an acoustic scheme, or a tactile scheme. Further, the processor 870 can provide the user interface device 200 with information about the operation sensitivity of the AEB device through the interface unit 830.

The user interface device 200 can output the information about the operation sensitivity of the AEB device through at least one of a visual scheme, an acoustic scheme, or a tactile scheme. The user interface device 200 can receive user input and provide a signal based on user input to the vehicle driver assistance apparatus 800.

The processor 870 can receive a first signal corresponding to a first user input from the user interface device 200 through the interface unit 830, and set the sensing range of the object detection device 300 based on the first signal. Also, the processor 870 can receive a second signal corresponding to a second user input from the user interface device 200 through the interface unit 830, and determine the operation sensitivity of the AEB device based on the second signal.

The processor 870 can also divide the operation sensitivity of the AEB device into a plurality of levels. The processor 870 can select the operation sensitivity of the AEB device as any one of the plural levels based on the driving environment information. The power supply 890 can supply a power source necessary for an operation of each component according to control of the processor 870. Particularly, the power supply 890 can receive power from a battery inside a vehicle.

Figure 9:
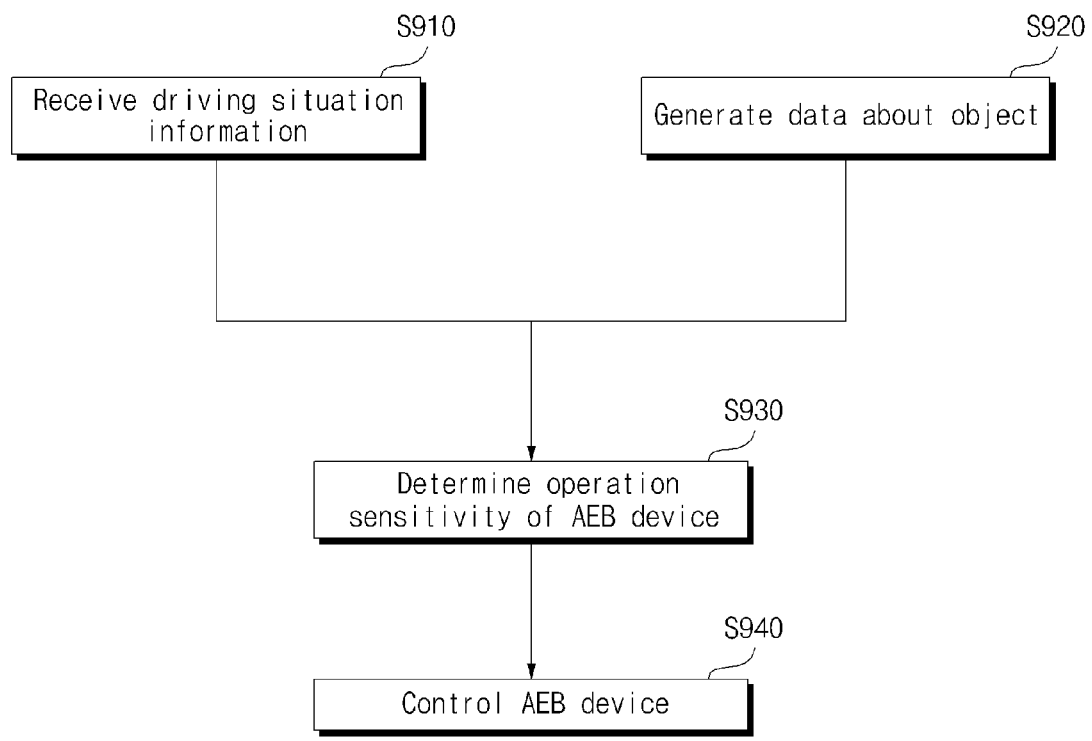
FIG. 9 is a flowchart illustrating an operation of a vehicle driver assistance apparatus according to an embodiment of the present invention.

Next, FIG. 9 is a flowchart illustrating an operation of a vehicle driver assistance apparatus according to an embodiment of the present invention. Referring to FIG. 9, the processor 870 can receive driving situation information through the interface unit 830 from another device, unit, or system in the vehicle 100 (S910). The driving situation information may include at least one of navigation information, driving environment information, or vehicle state information.

The navigation information may include vehicle location information, road type information indicating the type of a road on which a vehicle travels, and section state information about a section in which a vehicle travels. Also, the driving environment information may include timing information during traveling of a vehicle and weather information during traveling of a vehicle. The vehicle state information may include driving speed information of the vehicle 100, accumulated driving distance information of the vehicle 100, and accumulated braking distance information of the vehicle 100.

In addition, the object detection device 300 can generate data about an object outside a vehicle (S920). In particular, the processor 870 can receive the data about an object outside a vehicle, generated by the object detection device 300 and determine the operation sensitivity of the AEB device corresponding to the object, based on the driving situation information (S940). The processor 870 can then control the AEB device based on the determined operation sensitivity of the AEB device (S940).

Figure 10:
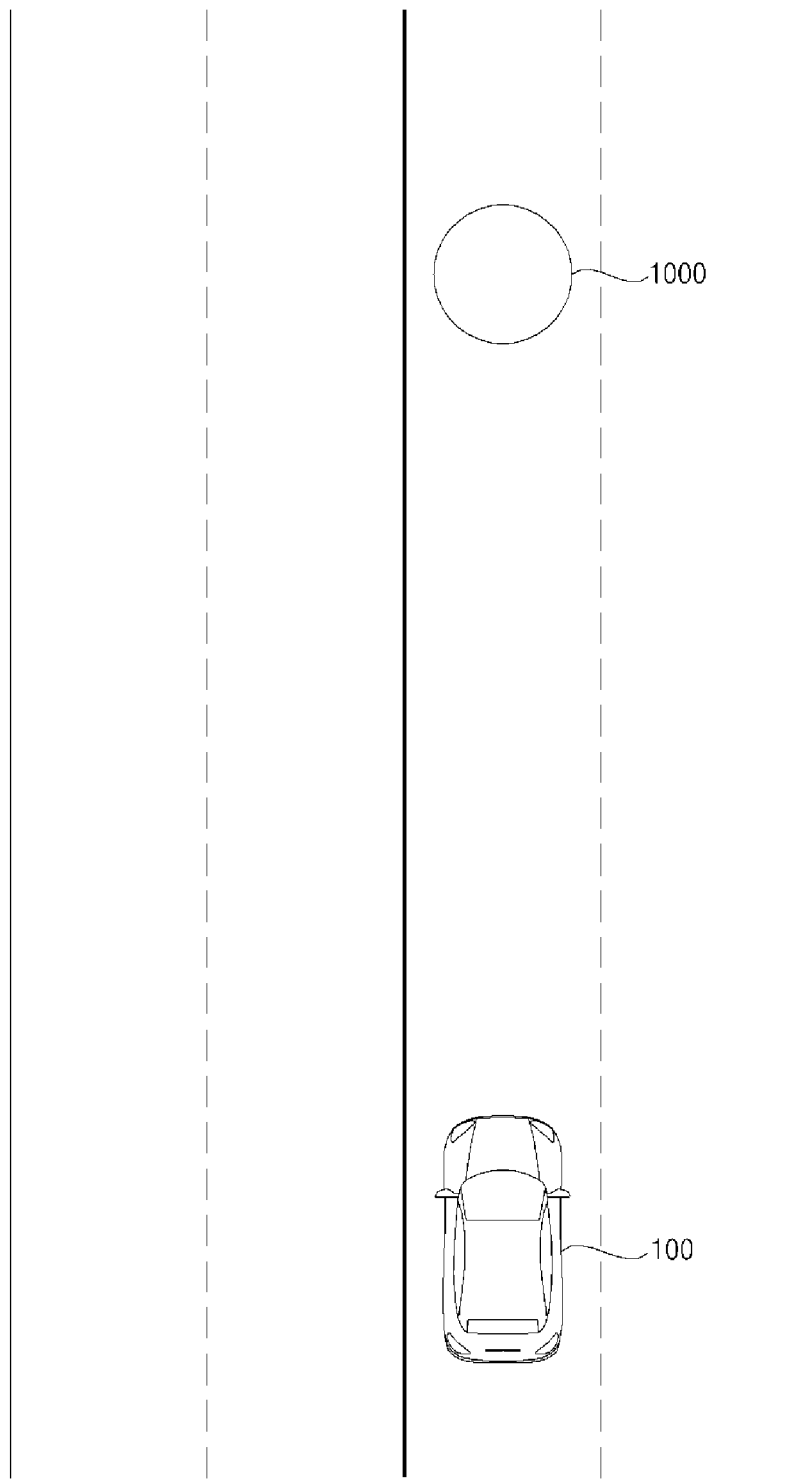
FIGS. 10 to 16 are diagrams referred to in explaining a vehicle driver assistance apparatus according to an embodiment of the present invention.

Next, FIGS. 10 to 16 are diagrams referred to in explaining a vehicle driver assistance apparatus according to an embodiment of the present invention. Referring to FIG. 10, the object detection device 300 can generate data about an object 1000 outside the vehicle 100. The data about the object 1000 may be sensing data about the object 1000 sensed through at least one of the camera 310, the radar 320, the lidar 330, the ultrasonic sensor 340, or the infrared sensor 350.

The processor 870 can receive the driving situation information through the interface unit 830 and determine operation sensitivity of the AEB device corresponding to the object 1000 based on the driving situation information. Further, the processor 870 can control an operation of an AEB device based on the data about the object 1000.

For example, the processor 870 can control the operation of the AEB device based on information as to whether the object 1000 is present. In another example, the processor 870 can control the operation of the AEB device based on a distance between the vehicle 100 and the object 1000 and a relative speed between the vehicle 100 and the object 1000.

The processor 870 can also control the operation of the AEB device by comparing a TTC between the object 1000 and the vehicle 100 with a reference value of a TTC stored in the memory 840. Further, the processor 870 can determine the operation sensitivity of the AEB device corresponding to the object 1000 based on the driving situation information.

The operation sensitivity of the AEB device may be a control parameter defined by at least one of the start of a braking operation, the end of the braking operation, or a degree of braking force. The processor 270 can determine a braking operation start condition and a degree of a braking operation of the AEB device, which correspond to an object, based on the driving situation information.

For example, the processor 870 can determine the reference value of the TTC, based on the driving situation information. The reference value of the TTC may differ according to a driving situation. For example, the processor 270 can determine at least one of a braking distance, a braking time, a braking speed, or a braking force, based on the driving situation information.

Figure 11:
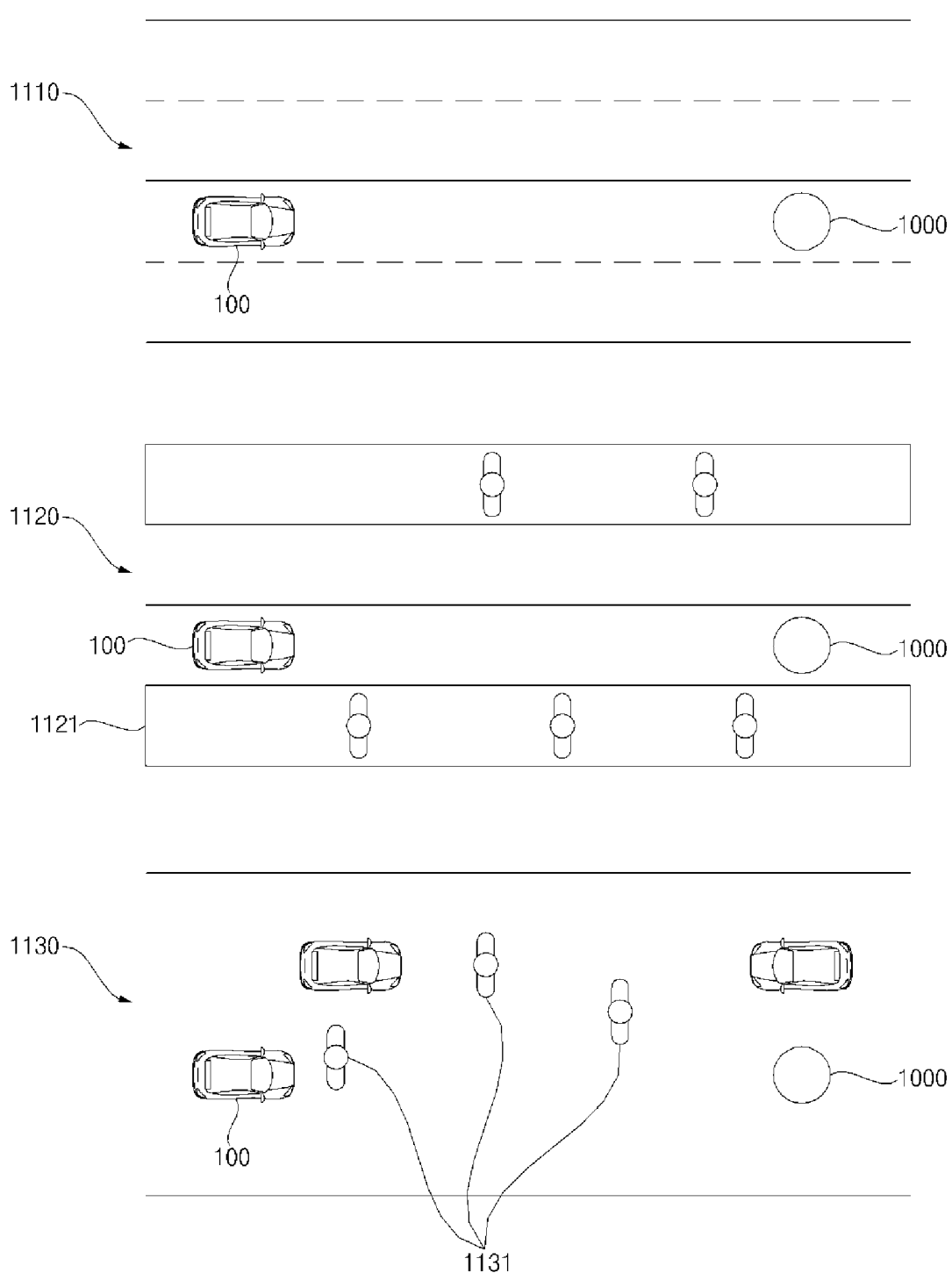

Referring to FIG. 11, the processor 870 can receive vehicle location information from the navigation system 770 through the interface unit 830. The processor 270 can also receive road type information indicating the type of a road on which a vehicle is traveling, based on the vehicle location information, from the navigation system through the interface unit 830.

A road may be divided into a road 1110 on which only vehicles travel (hereinafter, a first road), a road 1120 with a sidewalk 1121 next to it (hereinafter, a second road), and a road 1130 on which vehicles and pedestrians 1131 pass. The processor 870 can determine the operation sensitivity of the AEB device based on the type of a road on which the vehicle 100 travels.

In particular, the processor 870 can determine the operation sensitivity of the AEB device based on whether a road on which the vehicle 100 is traveling is the first road 1110, the second road 1120, or the third road 1130. For example, upon determining that the vehicle 100 is traveling on the third road 1130, the processor 870 can set the operation sensitivity of the AEB device on the third road 1130 to be lower than on the first road 1110 and the second road 1120.

If the operation sensitivity of the AEB device is high on the road 1130 on which vehicles and the pedestrians 1131 pass, normal traveling of the vehicle 100 may be impossible. In this instance, the operation sensitivity of the AEB device is set to be low so that the vehicle can normally travel and a unique function of the AEB device can be performed.

Figure 12:
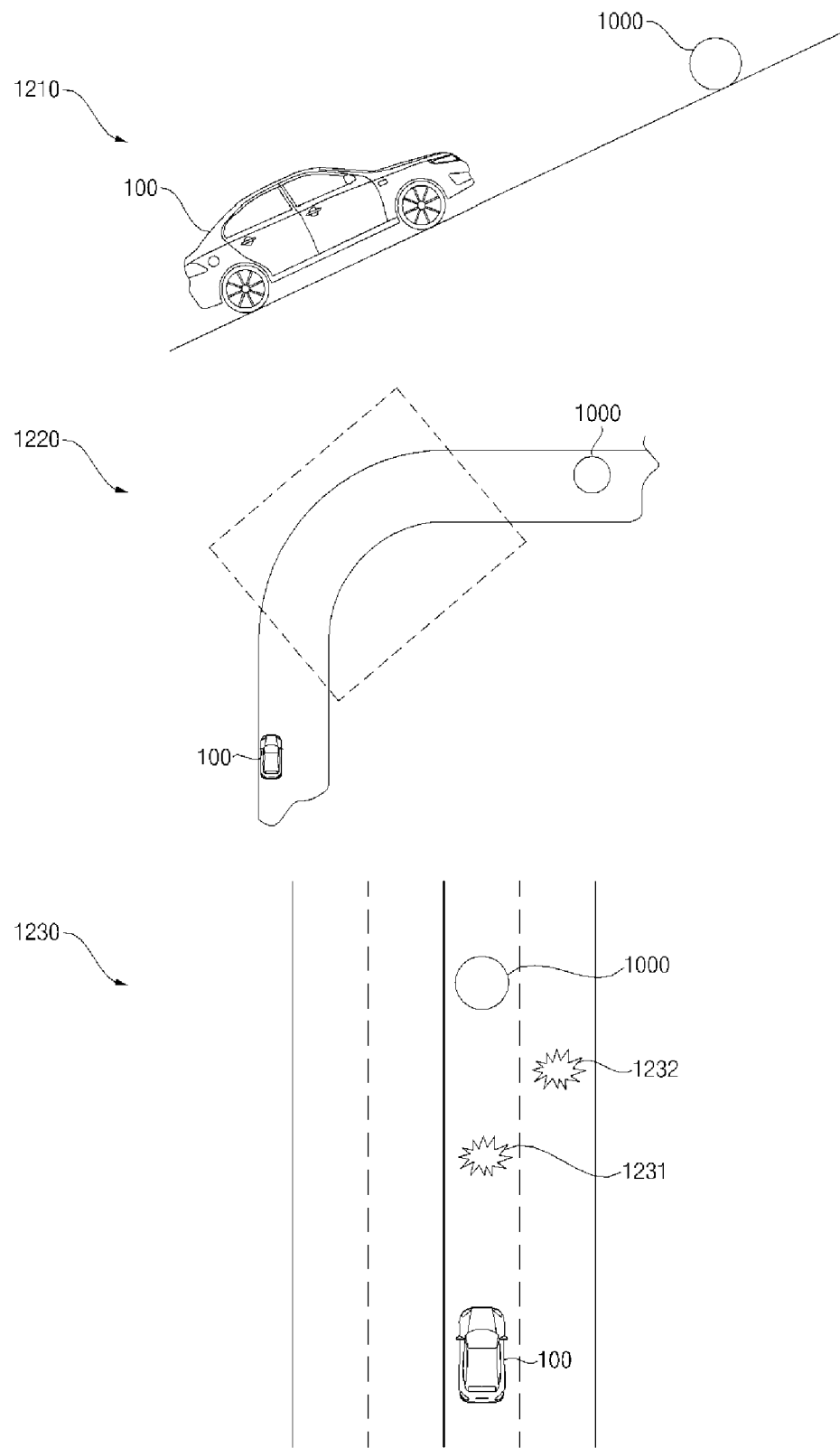

Referring to FIG. 12, the processor 870 can receive the vehicle location information from the navigation system 770 through the interface unit 830. The processor 870 can also receive section state information about a section in which a vehicle is traveling from the navigation system through the interface unit 830.

The section state information may include at least one of information as to whether a section is a slope section 1210, information as to whether a section is a curved section 1220, information as to whether a section 1230 corresponds to an accident occurrence section 1231, or information as to whether a section corresponds to a construction progress section 1232.

The processor 870 can determine the operation sensitivity of the AEB device based on the section state information. In particular, the processor 870 can determine the operation sensitivity of the AEB device based on whether the vehicle 100 is traveling in any one of the slope section 1210, the curved section 1220, the accident occurrence section 1231, and the construction progress section 1232.

For example, upon determining that the vehicle 100 travels in any one of the slope section 1210, the curved section 1220, the accident occurrence section 1231, and the construction progress section 1232, the processor 870 can set the operation sensitivity of the AEB device to be higher than when the vehicle 100 travels in a section other than the slope section 1210, the curved section 1220, the accident occurrence section 1231, and the construction progress section 1232.

There is a high probability of an emergency situation in the slope section 1210, the curved section 1220, the accident occurrence section 1231, and the construction progress section 1232. Even when an emergency situation occurs, the AEB device can perform a fast operation in a state in which the operation sensitivity of the AEB device is set to be high, thereby increasing safety.

Figure 13:
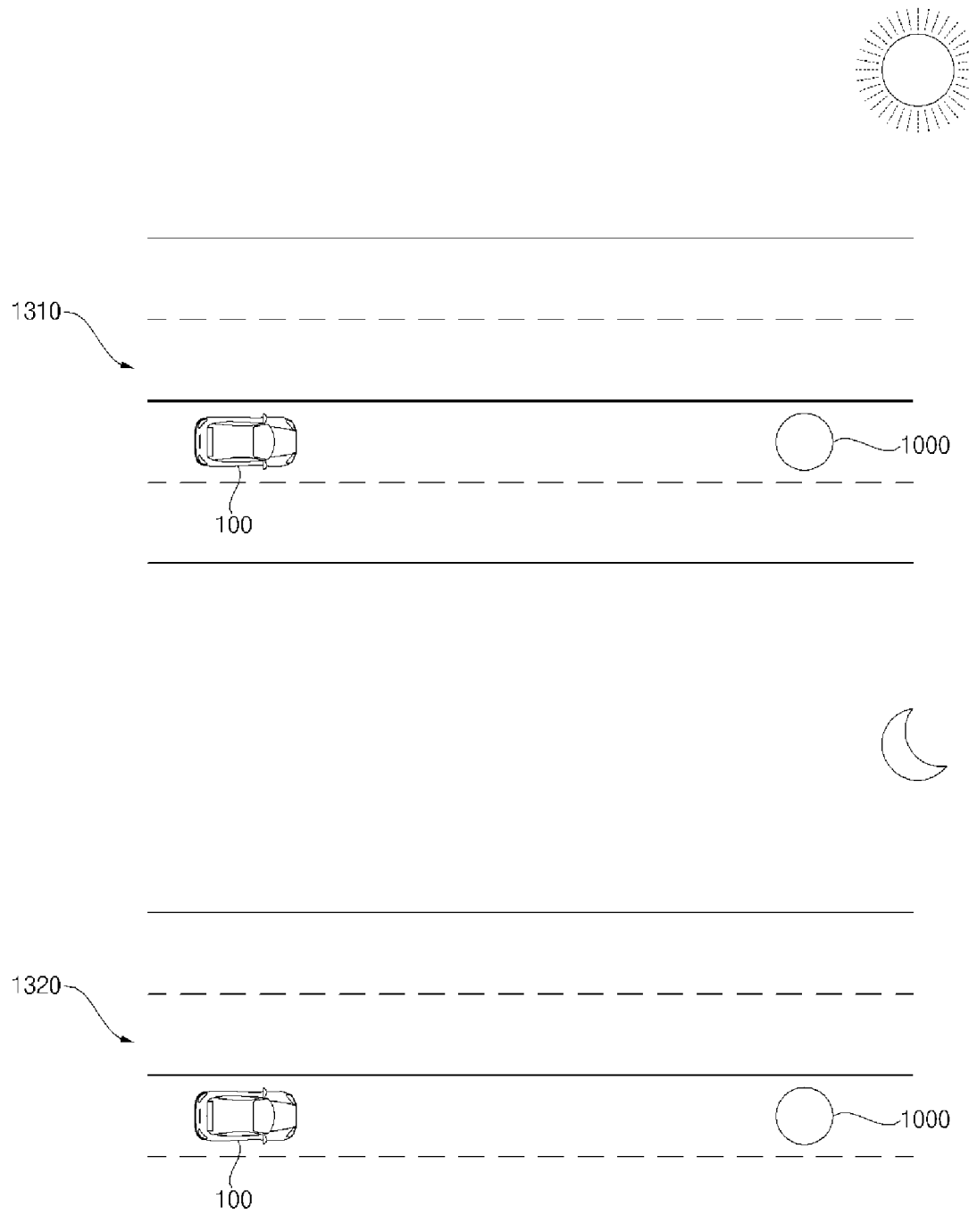

Referring to FIG. 13, the processor 870 can acquire timing information while a vehicle travels from the communication device 400 through the interface unit 830. The processor 870 can determine whether a traveling timing of the vehicle 100 is daytime or nighttime, based on the timing information.

Further, the processor 870 can determine the operation sensitivity of the AEB device based on the timing information. The processor 870 can also determine the operation sensitivity of the AEB device based on whether a traveling timing of the vehicle 100 is daytime or nighttime. For example, upon determining that the traveling timing of the vehicle 100 is daytime, the processor 870 can set the operation sensitivity of the AEB device to be lower than when the traveling timing of the vehicle 100 is nighttime. Upon determining that the driving timing of the vehicle 100 is nighttime, the processor 870 can set the operation sensitivity of the AEB device to be higher than when the traveling timing of the vehicle 100 is daytime.

Figure 14:
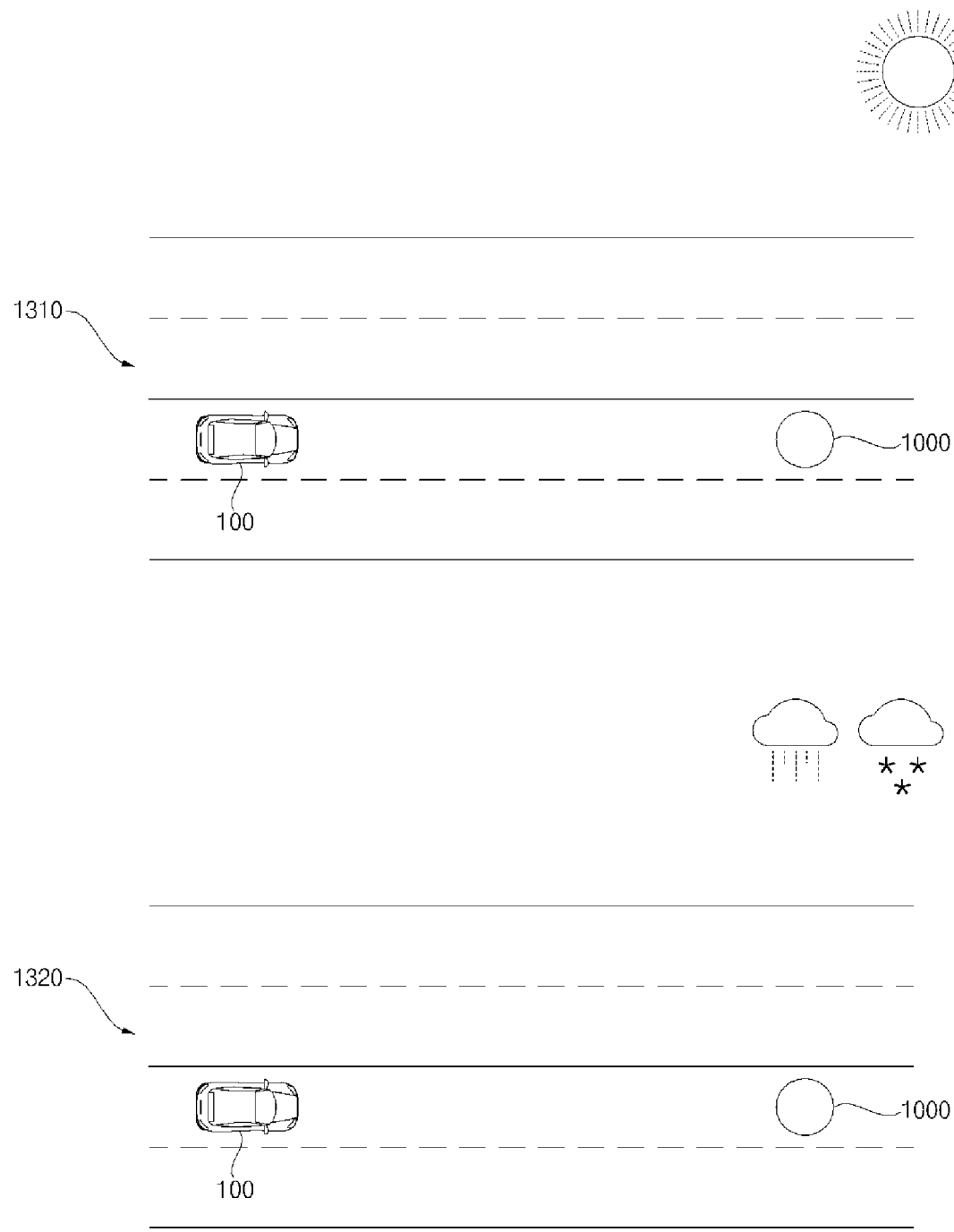

Referring to FIG. 14, the processor 870 can receive weather information during traveling of a vehicle from the communication device 400 through the interface unit 830 and determine the operation sensitivity of the AEB device based on the weather information. The processor 870 can also determine the operation sensitivity of the AEB device based on whether it is sunny, rainy, or snowy. For example, upon determining that the vehicle 100 travels in rainy or snowy weather, the processor 870 can set the operation sensitivity of the AEB device to be higher than when the vehicle 100 travels on a sunny day.

Figure 15:
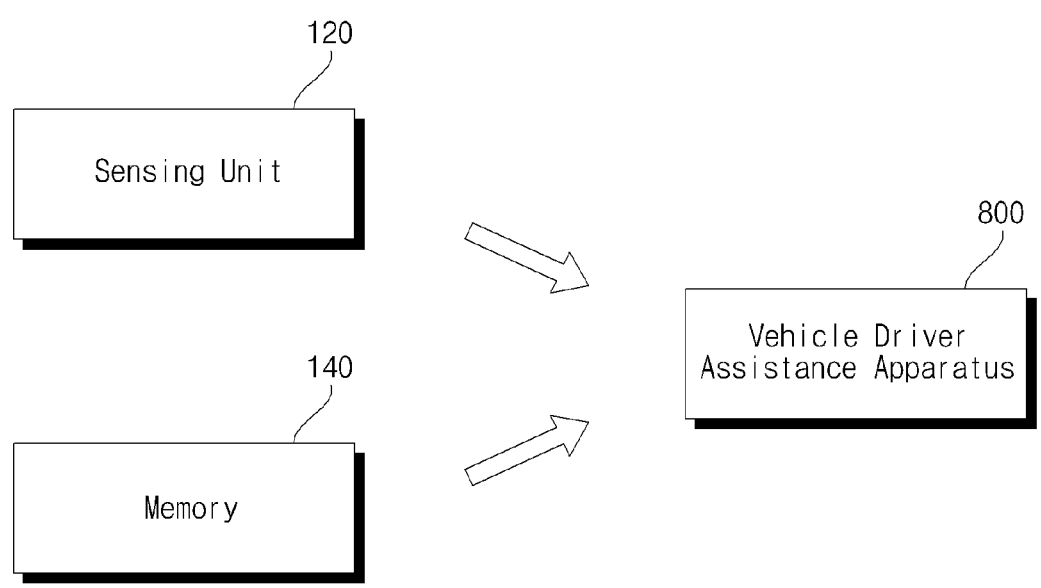

Referring to FIG. 15, the processor 870 can receive vehicle state information from the sensing unit 120 or the memory 140 through the interface unit 830. The processor 870 can also receive vehicle driving speed information from the sensing unit 120 through the interface unit 830. The processor 870 can determine the operation sensitivity of the AEB device based on the driving speed information. For example, the processor 870 can set the operation sensitivity of the AEB device when the vehicle 100 travels at a low speed to be lower than when the vehicle 100 travels at a high speed.

In addition, traveling at a low speed may be traveling at a speed of 30 km/h or less, and traveling at a high speed may be traveling of 80 km/h or more. When the vehicle 100 travels at a low speed on the road 1130 on which the vehicles and the pedestrians 1131 pass, the processor 870 can set the operation sensitivity of the AEB device to be low.

The processor 870 can also determine the operation sensitivity of an AEB device based on an abrasion state of at least one tire. The processor 870 can receive accumulated driving distance information of the vehicle 100 from the memory 140 through the interface unit 830 and determine the operation sensitivity of the AEB device based on the accumulated driving distance information after a tire is fixed or exchanged.

In addition, the processor 870 can determine the operation sensitivity of the AEB device based on a brake pad abrasion state. The processor 870 can receive accumulated braking distance information of the vehicle 100 from the memory 140 through the interface unit 830 and determine the operation sensitivity of the AEB device based on the accumulated braking distance information after a brake pad is fixed or exchanged.

Figure 16:
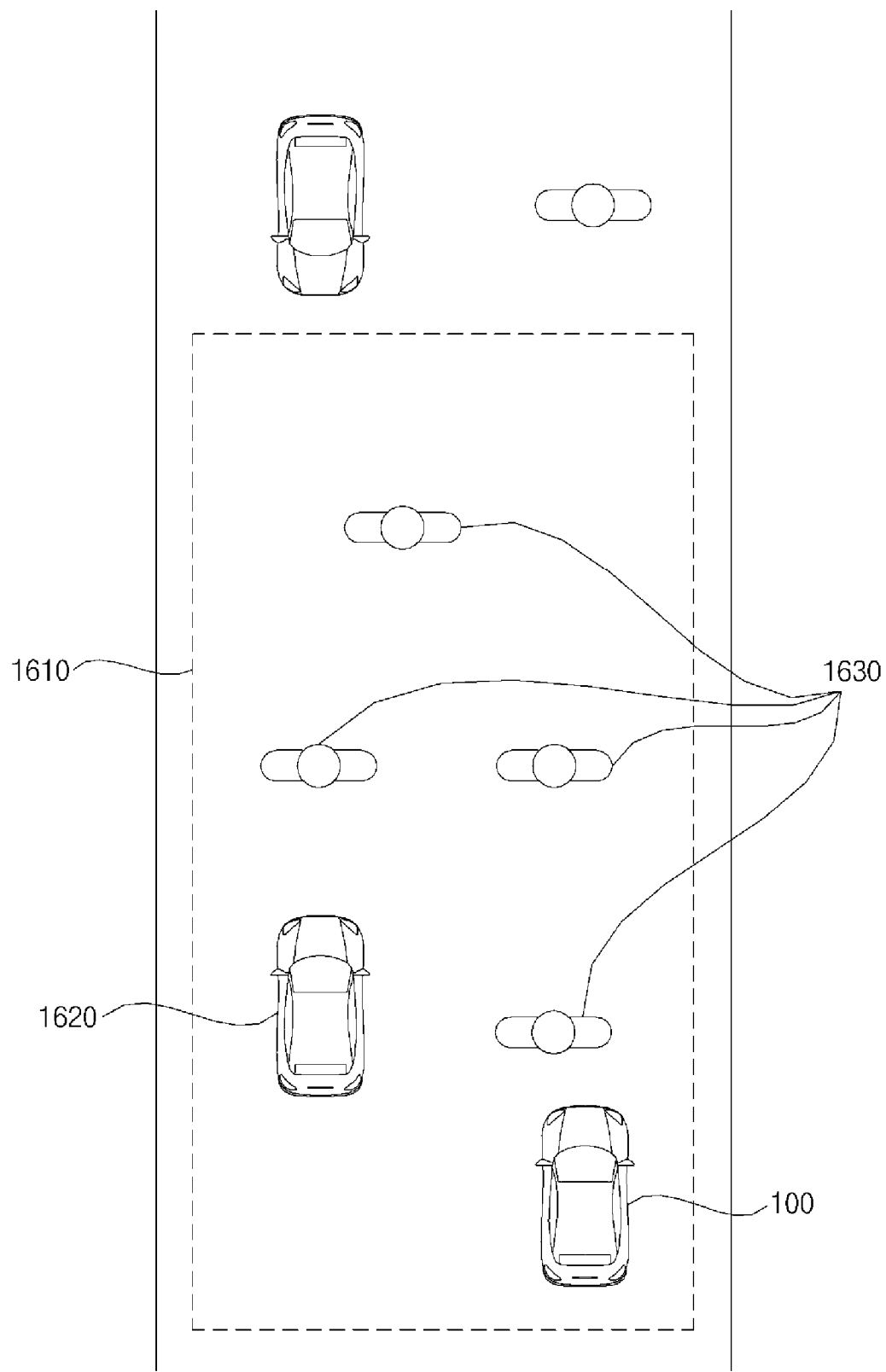

Referring to FIG. 16, the vehicle 100 may travel on a road on which vehicles 100 and 1620 and pedestrians 1630 pass. In this instance, the processor 870 can determine whether the moving objects 1620 and 1630 are present within a set distance 1610, based on data about an object. The moving objects may be the other vehicle 1620 or the pedestrians 1630.

The processor 870 can determine the operation sensitivity of the AEB device based further on whether the moving objects 1630 are present. For example, upon determining that the moving objects 1630 are present, the processor 870 can set the operation sensitivity of the AEB device to be lower than when the moving objects 1630 are not present.

The processor 870 can also determine the number of the moving objects 1630 located within a set distance based on the data about an object. The processor 870 can determine the operation sensitivity of the AEB device based further on the number of the moving objects 1630. For example, when the number of the moving objects 1630 is above a reference value, the processor 870 can lower the operation sensitivity of the AEB device.

Also, the processor 870 can control the operation sensitivity of the AEB device to be decreased as the number of the pedestrians 1630 is increased. Thus, inconvenience caused by a phenomenon in which traveling is not performed due to frequent autonomous braking can be solved by lowering the operation sensitivity of the AEB device as the number of the pedestrians 1630 is increased.

Figure 17:
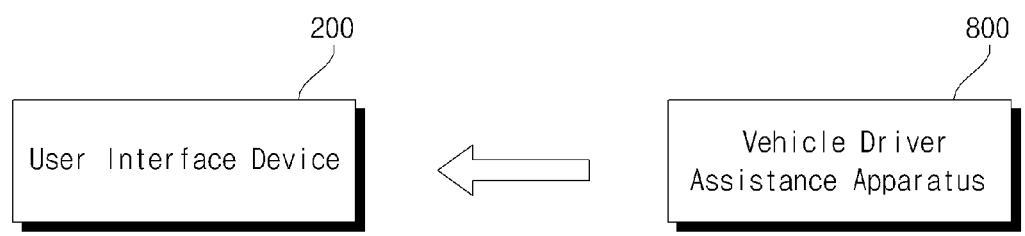
FIGS. 17 to 19 are diagrams referred to in explaining operations of a vehicle driver assistance apparatus and a user interface device according to an embodiment of the present invention.
Figure 18:
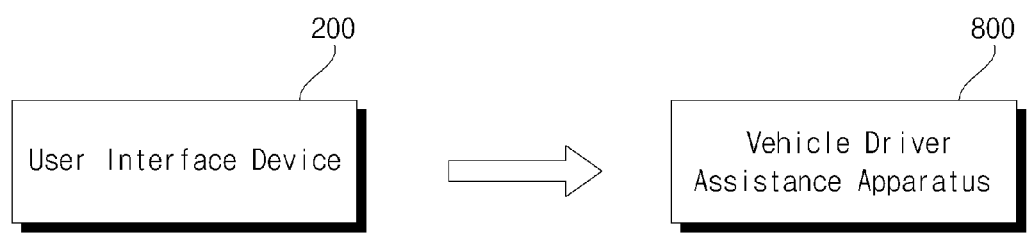
Figure 19:
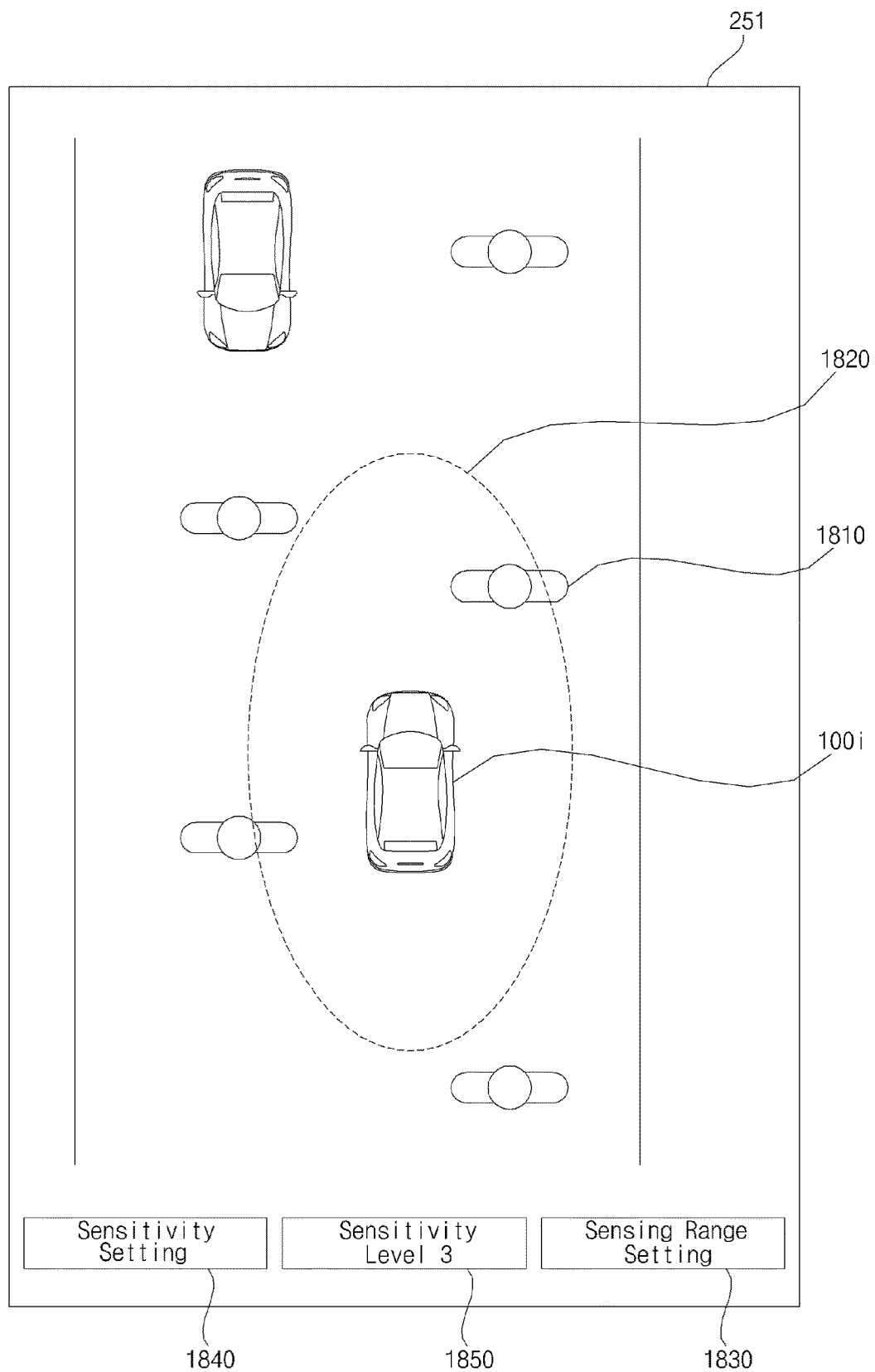

Next, FIGS. 17 to 19 are diagrams referred to in explaining operations of a vehicle driver assistance apparatus and a user interface device according to an embodiment of the present invention. Referring to FIG. 17, the vehicle driver assistance apparatus 800 can transmit at least one of a signal, data, or information to the user interface device 200.

The processor 870 can provide the user interface device 200 with information about an object which is an operation cause of the AEB device through the interface unit 830. For example, when the AEB device operates based on detection of a first object, the processor 870 can provide information about the first object to the user interface device 200.

The information about the first object may include information about what is the first object, information about a relative distance between the vehicle 100 and the first object, and information about a relative speed between the vehicle 100 and the first object. The processor 870 can provide information about a sensing range of the object detection device 300 to the user interface device 200 through the interface unit 830.

For example, the processor 870 can provide the user interface device 200 with the information about the sensing range of at least any one of the camera 310, the radar 320, the lidar 330, the ultrasonic sensor 340, or the infrared sensor 350. In addition, the processor 870 can provide the user interface device 200 with information about at least any one of a front view sensing range, a rear view sensing range, a left side view sensing range, or a right side view sensing range.

The processor 870 can transmit information about the operation sensitivity of the AEB device to the user interface device 200 through the interface unit 830. For example, the processor 870 can provide the information about the operation sensitivity of the AEB device which is determined (or set) based on the driving situation information to the user interface device 200 through the interface unit 830.

Referring to FIG. 18, the vehicle driver assistance apparatus 800 can receive at least one of the signal, data, or information from the user interface device 200. The user interface device 200 can receive user input through the input device 210 and provide a signal based on the received user input to the vehicle driver assistance apparatus 800.

For example, the user interface device 200 can receive a first user input for setting the sensing range of the object detection device 300 and provide a first signal based on the first user input to the vehicle driver assistance apparatus 800. The user interface device 200 can also receive a second user input for setting the operation sensitivity of the AEB device and provide a second signal based on the second user input to the vehicle driver assistance apparatus 800.

In addition, the processor 870 can receive a signal based on user input through the interface unit 830. For example, the processor 870 can receive the first signal through the interface unit 830 and set the sensing range of the object detection device 300 based on the first signal. The processor 870 can also receive the second signal through the interface unit 830 and set the operation sensitivity of the AEB device based on the second signal.

Referring to FIG. 19, the user interface device 200 can control the display unit 251 to display graphical objects 1810, 1820, 1830, 1840, and 1850 based on at least one of the signal, data, or information received from the vehicle driver assistance apparatus 800. The user interface device 200 can also display, through the display unit 251, the graphical object 1810 corresponding to information about an object which is an operation cause of the AEB device. In this instance, a user can identify the cause of braking of the vehicle 100.

The user interface device 200 can also display, through the display unit 251, the graphical object 1820 corresponding to information about a sensing range of the object detection device 300. Further, the sensing range of the object detection device 300 may be a range for detecting an object which is the basis of operation of the AEB device. In this instance, a user can identify the cause of braking of the vehicle 100.

Further, the user interface device 200 can display, through the display unit 251, the graphical object 1830 corresponding to information about the operation sensitivity of the AEB device. The operation sensitivity of the AEB device can also be divided into a plurality of levels, and the user interface device 200 can display a button 1840 for setting the sensing range.

The user interface device 200 can also receive the first user input based on a touch input for the button 1840 for setting the sensing range. The user interface device 200 can display a button 1850 for setting the sensitivity of the AEB device. Further, the user interface device 200 can receive the second user input based on a touch input for the button 1850 for setting the sensitivity of the AEB device.

As is apparent from the foregoing description, embodiments of the present invention have one or more effects. First, user inconvenience can be solved by performing an autonomous emergency braking operation according to driving situation. Second, occurrence of a traffic accident can be reduced by adaptively performing a unique function of the autonomous emergency braking operation according to a driving situation. Third, user convenience is increased by providing information about the autonomous emergency braking operation through the user interface device. The effects of the present invention should not be limited to the aforementioned effects and other not-mentioned effects will be clearly understood by those skilled in the art from the claims.

The present invention may be implemented as code that can be written on a computer-readable recording medium and thus read by a computer system. The computer-readable recording medium may be any type of recording device in which data is stored in a computer-readable manner. Examples of the computer-readable recording medium include a hard disk drive (HDD), a solid state drive (SSD), a silicon disk drive (SDD), a read only memory (ROM), a random access memory (RAM), a compact disk ROM (CD-ROM), a magnetic tape, a floppy disk, an optical data storage, and a carrier wave (e.g., data transmission over the Internet). The computer may include the processor 270 or the controller 170. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A driver assistance apparatus for a vehicle, comprising:
an interface unit; and
a processor configured to:
receive driving situation information and data about an object outside the vehicle through the interface unit,
determine an operation sensitivity of an autonomous emergency braking (AEB) operation corresponding to the object based on the received driving situation information, and
generate a control signal of the AEB operation to control a braking operation of the vehicle based on the determined operation sensitivity,
wherein the processor is further configured to:
acquire location information of the vehicle from the driving situation information,
decrease the operation sensitivity of the AEB operation so as not to perform frequent autonomous braking on a road due to the object located within a set distance from the vehicle, and
acquire a section state information about a section in which the vehicle travels based on the vehicle location information and determine the operation sensitivity based on the section state information.

2. The vehicle driver assistance apparatus according to claim 1, wherein the processor is further configured to:
determine a braking operation start condition and a degree of a braking operation corresponding to the object based on the driving situation information, and
generate the control signal of the AEB operation to apply the braking operation of the vehicle according to the determined braking operation start condition and the degree of the braking operation.

3. The vehicle driver assistance apparatus according to claim 1, wherein the processor is further configured to:
determine the operation sensitivity based on the location information.

4. The vehicle driver assistance apparatus according to claim 3, wherein the processor is further configured to:
acquire road type information indicating a type of the road on which the vehicle is traveling based on the location information, and
determine the operation sensitivity based on the road type information.

5. The vehicle driver assistance apparatus according to claim 1, wherein the processor is further configured to:
acquire timing information during traveling of the vehicle from the driving situation information, and
determine the operation sensitivity based on the timing information.

6. The vehicle driver assistance apparatus according to claim 1, wherein the processor is further configured to:
acquire weather information during traveling of the vehicle from the driving situation information, and
determine the operation sensitivity based on the weather information.

7. The vehicle driver assistance apparatus according to claim 1, wherein the processor is further configured to:
acquire vehicle state information from the driving situation information, and
determine the operation sensitivity based on the vehicle state information.

8. The vehicle driver assistance apparatus according to claim 7, wherein the processor is further configured to:
acquire driving speed information of the vehicle from the driving situation information, and
determine the operation sensitivity based on the driving speed information.

9. The vehicle driver assistance apparatus according to claim 7, wherein the processor is further configured to:
acquire accumulated driving distance information of the vehicle from the driving situation information, and
determine the operation sensitivity based on the accumulated driving distance information.

10. The vehicle driver assistance apparatus according to claim 7, wherein the processor is further configured to:
acquire accumulated braking distance information of the vehicle from the driving situation information, and
determine the operation sensitivity based on the accumulated braking distance information.

11. The vehicle driver assistance apparatus according to claim 1, wherein the processor is further configured to:
  determine whether the object is a moving object located within awithin the set distance from the vehicle, and
  determine the operation sensitivity based on whether the moving object is present.

12. The vehicle driver assistance apparatus according to claim 11, wherein the processor is further configured to:
  determine a number of moving objects located within the set distance based on the data about the object, and
  determine the operation sensitivity based further on the number of moving objects.

13. The vehicle driver assistance apparatus according to claim 12, wherein when the moving object includes a pedestrian, the processor decreases the operation sensitivity of the AEB operation as a number of pedestrians increases.

14. The vehicle driver assistance apparatus according to claim 1, wherein the processor is further configured to output information about the object corresponding to a cause of the AEB operation through a user interface device included in the vehicle.

15. The vehicle driver assistance apparatus according to claim 14, wherein the processor is further configured to output information about a sensing range of the object outside the vehicle to the user interface device.

16. The vehicle driver assistance apparatus according to claim 14, wherein the processor is further configured to output information about the operation sensitivity to the user interface device.

17. The vehicle driver assistance apparatus according to claim 14, wherein the processor is further configured to:
  receive a signal corresponding to user input from the user interface device, and
  set a sensing range of the object outside the vehicle based on the received signal.

18. The vehicle driver assistance apparatus according to claim 14, wherein the processor is further configured to:
  receive a signal corresponding to a user input from the user interface device, and
  determine the operation sensitivity based on the received signal.

19. The vehicle driver assistance apparatus according to claim 1, wherein the operation sensitivity is a control parameter defined by i) at least one of the start of a braking operation, the end of the braking operation, and a degree of braking force, and ii) a frequency of the AEB operation.

20. A vehicle, comprising:
  a vehicle driver assistance apparatus; and
  a user interface device including a display,
  wherein the vehicle driver assistance apparatus includes:
  an interface unit; and
  a processor configured to:
  receive driving situation information and data about an object outside the vehicle through the interface unit,
  determine an operation sensitivity of an autonomous emergency braking (AEB) operation corresponding to the object based on the received driving situation information,
  generate a control signal of the AEB operation to control a braking operation of the vehicle based on the determined operation sensitivity, and
  output information about the object corresponding to a cause of the AEB operation through the user interface device, information about the operation sensitivity of the AEB operation, and information about a sensing range of the object,
  wherein the processor is further configured to:
  acquire location information of the vehicle from the driving situation information,
  decrease the operation sensitivity of the AEB operation so as not to perform frequent autonomous braking on a road due to the object located within a set distance from the vehicle, and
  acquire a section state information about a section in which the vehicle travels based on the vehicle location information and determine the operation sensitivity based on the section state information, and
  wherein the user interface device is configured to:
  control the display to display at least one of a first graphical object corresponding to the information about the object corresponding to the cause of the AEB operation, a second graphical object corresponding to information about the sensing range of the object, and a third graphical object corresponding to information about the operation sensitivity of the AEB operation.

* * * * *